(12) United States Patent
Arima et al.

(10) Patent No.: US 6,446,897 B1
(45) Date of Patent: Sep. 10, 2002

(54) SEAT BELT SYSTEM

(75) Inventors: Takashi Arima; Kenichi Morizane; Masuo Matsuki; Kiyoshi Ogawa; Katsuyasu Ono, all of Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/518,274

(22) Filed: Mar. 3, 2000

(30) Foreign Application Priority Data

| Mar. 4, 1999 | (JP) | 11-057091 |
| Mar. 4, 1999 | (JP) | 11-057092 |
| Nov. 19, 1999 | (JP) | 11-329149 |
| Nov. 24, 1999 | (JP) | 11-333514 |

(51) Int. Cl.⁷ .............................................. B60R 22/34
(52) U.S. Cl. .......................... 242/374; 60/407; 60/632; 280/806; 297/480
(58) Field of Search ................ 280/807, 806; 297/474, 475, 480; 242/374; 60/407, 632, 638

(56) References Cited

U.S. PATENT DOCUMENTS

| 3,741,494 A | * | 6/1973 | Fiala ........................ 242/107.4 |
| 4,444,010 A | | 4/1984 | Bendler |
| 4,750,685 A | | 6/1988 | Frei |
| 5,443,222 A | | 8/1995 | Mödinger et al. |
| 5,451,008 A | | 9/1995 | Hamaue |
| 5,489,072 A | | 2/1996 | Gordon et al. |
| 5,690,295 A | | 11/1997 | Steinberg et al. |
| 5,697,571 A | | 12/1997 | Dybro et al. |
| 5,906,327 A | | 5/1999 | Chamings et al. |
| 5,906,328 A | * | 5/1999 | Hamanue et al. ........... 242/374 |

FOREIGN PATENT DOCUMENTS

| DE | 31 31 637 | | 1/1983 |
| DE | 195 12 660 | | 10/1995 |
| DE | 196 02 549 | | 8/1996 |
| DE | 195 08 626 | | 9/1996 |
| EP | 641691 | * | 3/1995 |
| JP | 46-7710 | | 12/1971 |
| JP | 9-202213 | | 8/1997 |
| JP | 9-290707 | | 11/1997 |
| JP | 10-86791 | | 4/1998 |
| JP | 11-227566 | | 8/1999 |

* cited by examiner

Primary Examiner—Eric Culbreth
(74) Attorney, Agent, or Firm—Crowell & Moring LLP

(57) ABSTRACT

The present invention provides a seat belt system comprising: a moving element (36) rotatably received in a housing (26); a device (32) for applying a pressurized gas to the moving element (36) when abrupt deceleration occurs on a vehicle; a tensile member (40) responsive to movement of the moving element (36) extruded due to the pressurized gas to generate a rotational torque; and a clutch mechanism (44) for transmitting the rotational torque generated by the tensile member (40) to a retractor shaft (24) to rotate the shaft (24) in a webbing-winding direction.

14 Claims, 45 Drawing Sheets

36

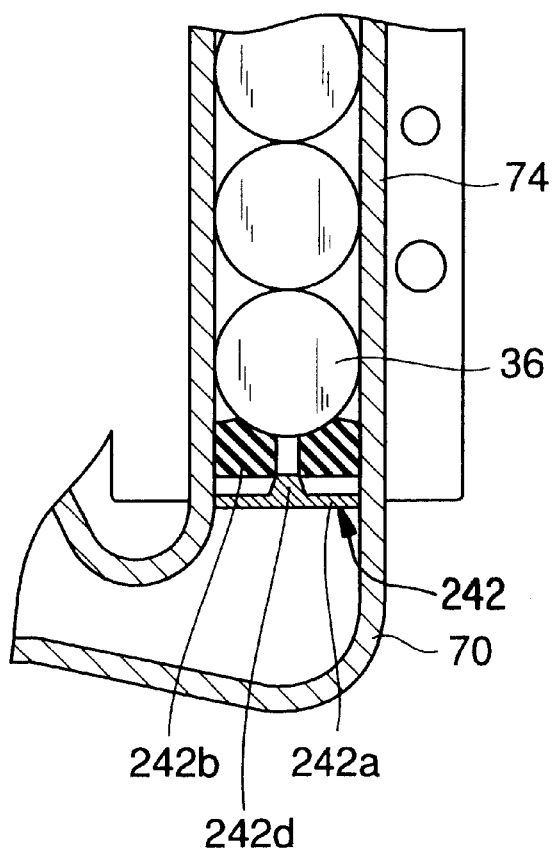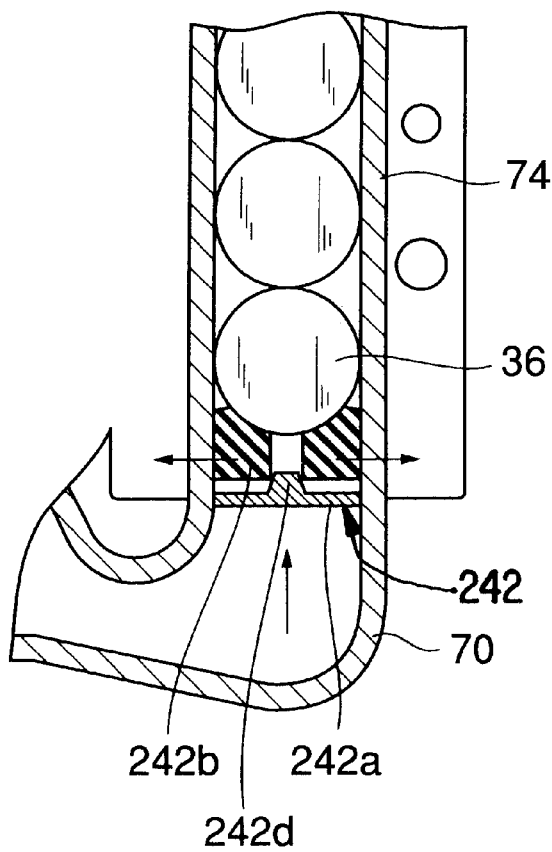

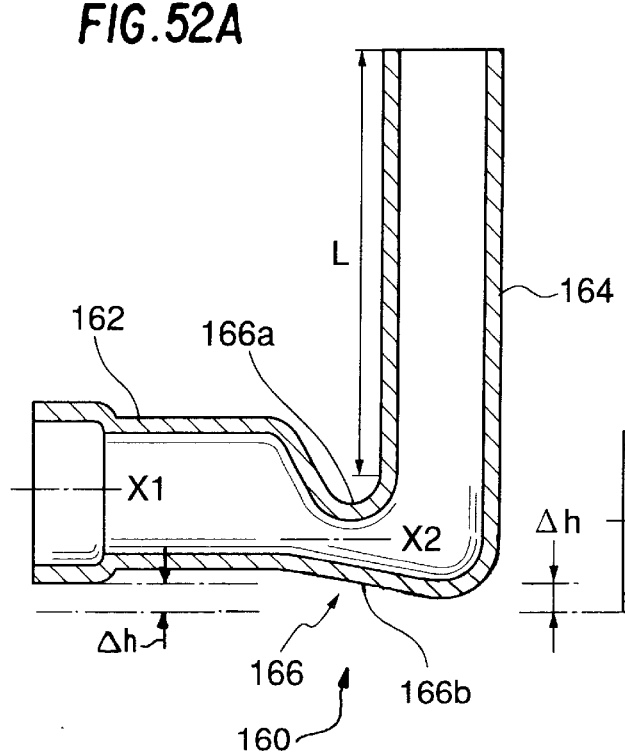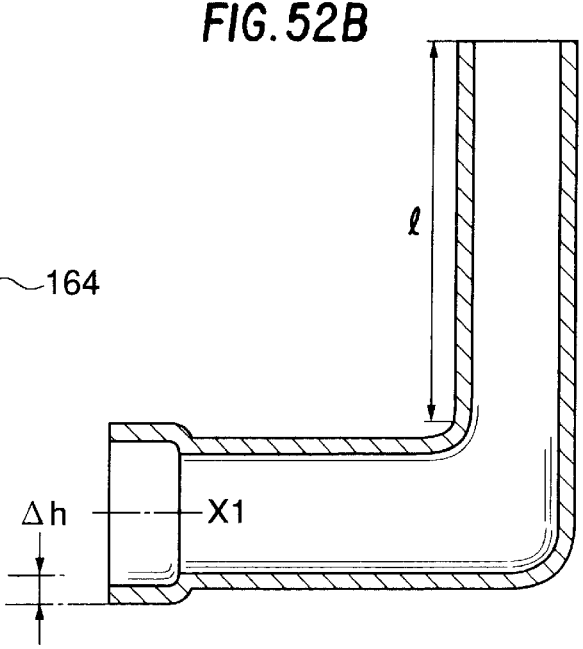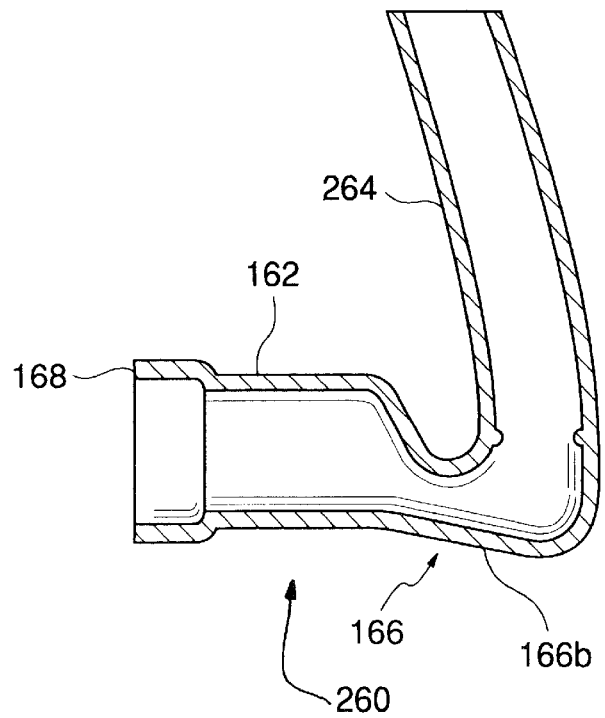

SEAT BELT SYSTEM

BACKGROUND OF THE INVENTION

1. Field of the Invention

The present invention relates to a seat belt system equipped with a pretensioner for use with a seat belt retractor in a vehicle, etc. which forces a take-up spindle of a webbing to rotate when abrupt deceleration occurs on a vehicle, tensioning the webbing in an occupant restraint direction.

2. Description of the Related Art

In this type of retractor pretensioner, various types have heretofore known in view of the principle of an emergency webbing-winding structure. Such pretensionere include those of the type that a rotary element (mass element) is pushed by a gas pressure, the type of a so-called "well-bucket" using a wire rope, the type that a spiral spring like member is caused to rotate by a gas pressure, and the type that the planet gears are caused to revolve and drive by a gas pressure.

In such pretensioners, those of the type that a rotary element is pushed by a gas pressure as disclosed in U.S. Pat. No. 4,444,010, DE-A1-195 12 660, DE-A1-196 02 549, etc. are known.

These pretensioners including rotary elements are represented by, for example, U.S. Pat. No. 4,444,010, in which high pressure gas causes multiple rotary elements to be press-delivered in a duct in the event of a vehicular collision, and these rotary elements are in turn engaged with drive gears arranged on the periphery of a retractor shaft, thus providing a torque of abruptly winding around a seat belt on the retractor shaft.

The above-stated pretension adapted to directly rotate the retractor shaft with biasing force of the rotary elements requires a long stroke for moving the rotary elements, or a long moving passage for the rotary elements, to generate sufficient biasing force. Such a long moving passage constructed linearly will bring a pretensioner as a whole to be large-sized in the particular direction. Hence, typically, much effort is made to ensure a sufficiently long stroke by meandering or spirally bending the pipe or the moving passage.

However, the pretensioner that ensures the aforementioned moving passage requires the pipe complicatedly bent, thus providing complexity in a machining process of the same with much requirement of improved machining accuracy such that a predetermined value of the passage width should be kept even at a curved portion. This leads to increased production costs while the pretensioner is inevitably increased in overall size owing to an increased volume though it may be possible to avoid a size increase of the pretensioner in a particular direction. Furthermore, complexity in moving passage conFIGuration still requires higher level measures against gas leakage. This finally brings increased production costs as well as an increase in size.

SUMMARY OF THE INVENTION

In order to overcome the foregoing disadvantages, an object of the present invention is to generate a sufficient amount of rotating a retractor shaft to wind up a webbing with a short moving stroke of a pressure transmission member that is pushed by a pressure to thereby attain a webbing-winding feature equivalent to an employment of a longer stoke. The present invention is also intended to downsize and simplify the entire structure to facilitate the vehicle-loading with low production costs.

It is another object of the present invention to reduce gas leakage within the moving passage.

In order to achieve the foregoing objects, the present invention provides a seat belt system equipped with a retractor including a pretensioner, the retractor comprising:
  a retractor base;
  a retractor shaft rotatably supported by the retractor base and biased in a webbing-winding direction;
  a gas generator mounted to the retractor base;
  a drive member driven by the gas generator to wind in the retractor shaft in the webbing-winding direction; and
  a clutch mechanism connecting the drive member to the retractor shaft, the clutch mechanism comprising
    a pulley connected to the drive member and coaxially aligned with the retractor shaft, the pulley having a cam, and
    a plate rotatable relative to the pulley in a direction of rotation of the retractor shaft, the plate having integrally engaging fingers deformable to engage with the retractor shaft through the cam as the plate rotates relative to the pulley.

With the thus constructed system, the number of parts in the clutch mechanism can be reduced with low production costs.

In order to achieve the foregoing objects, the present invention further provides a seat belt system equipped with a retractor including a pretensioner, the retractor comprising:
  a retractor base;
  a retractor shaft rotatably supported by the retractor base and biased in a webbing-winding direction;
  a casing mounted on the retractor base, including a pressure chamber and a moving element passage communicated to the pressure chamber;
  a gas generator for generating a high pressure gas into the pressure chamber;
  a drive member driven by the gas generator to wind in the retractor shaft in the webbing-winding direction; and
  a clutch mechanism connecting the drive member to the retractor shaft,
  wherein the drive member comprises:
    a medium connected with the clutch mechanism; and
    a moving member operable to actuate the medium and movable within the moving element passage, the moving element passage having a portion rectangular in transverse section relative to a moving direction of the moving member.

With the thus constructed system, the dimension widthwise of the retractor (the dimension as viewed longitudinally of the retractor shaft) can be reduced to downsize the retractor as a whole.

In order to achieve the foregoing objects, the present invention still further provides a seat belt system equipped with a retractor including a pretensioner, the retractor comprising:
  a retractor base;
  a retractor shaft rotatably supported by the retractor base and biased in a webbing-winding direction;
  a gas generator mounted to the retractor base;
  a drive member driven by the gas generator to wind in the retractor shaft in the webbing-winding direction;
  a clutch mechanism connecting the drive member to the retractor shaft; and
  a drive member releasing mechanism for, when the drive member further mover to a webbing winding-out position at the side of a webbing winding-out direction from the initial position before the gas generator is actuated, permitting the retractor shaft to rotate in a webbing winding-out direction in response to the movement to the winding-out position.

With the thus constructed system, the retractor shaft may be freely rotatable when the retractor shaft is wound out to the webbing winding-out position after the pretensioner has been actuated.

In order to achieve the foregoing objects, the present invention still further provides a seat belt system equipped with a retractor including a pretensioner, the retractor comprising:

a retractor base;
a retractor shaft rotatably supported by the retractor base and biased in a webbing-winding direction;
a gas generator;
a pipe-shaped member mounted on the retractor base, the pipe-shaped member including a circle-in-section part for receiving a gas pressure generated by the gas generator, and a rectangle-in-section part;
a drive member driven by a gas pressure generated by the gas generator to wind in the retractor shaft in the webbing-winding direction, the drive member comprising a medium and a moving member operable to actuate the medium and movable within the rectangle-in-section part of the pipe-shaped member; and a clutch mechanism connecting the drive member to the retractor shaft.

With the thus constructed system, the dimension widthwise of the retractor corresponding to the region where the moving member is movable can be reduced with the simplified structure.

In order to achieve the foregoing objects, the present invention still further provides a seat belt system equipped with a retractor including a pretensioner, the retractor comprising:

a retractor base;
a retractor shaft rotatably supported by the retractor base and biased in a webbing-winding direction;
a casing mounted on the retractor base, including a pressure chamber and a moving element passage communicated to the pressure chamber;
a gas generator for generating a high pressure gas into the pressure chamber;
a drive member driven by the gas generator to wind in the retractor shaft in the webbing-winding direction; and
a clutch mechanism connecting the drive member to the retractor shaft, and
wherein the drive member comprises;
a pushing member driven by a gas pressure generated by the gas generator and disposed in the moving element passage;
a tension member having one end mounted on the retractor base and the other end mounted on the clutch mechanism; and
a moving element pushed by the pushing member to press a portion between both ends of the tension member.

With the thus constructed system, a larger amount of the tension member can be wound out (increased speed) than a moving distance of the moving element, resulting in a compact pretensioner. Further, since the tension member that is retained by a clamp is released after the pretensioner has been actuated, the retractor shaft may be freely rotatable, making it possible to wind out the wound webbing.

In addition, the gas pressure can be effectively used with avoidance of any gas leakage from the moving element passage.

BRIEF DESCRIPTION OF THE DRAWINGS

The above and other objects, features and advantages of the present invention will become apparent from the following detailed description, taken in conjunction with the accompanying drawings, in which:

FIGS. 47A and 47B are explanatory diagrams for explaining the fourteenth embodiment of the present invention in which the pipe is combined with the seal member having a taper to outwardly flare the same;

FIGS. 52A and 52B are an explanatory diagram for explaining the effects of a constriction 166a–166b of the pipe;

FIG. 53 is an explanatory diagram for explaining the pipe in accordance with the sixteenth embodiment of the present invention;

DETAILED DESCRIPTION OF THE PREFERRED EMBODIMENTS

Figure 1:
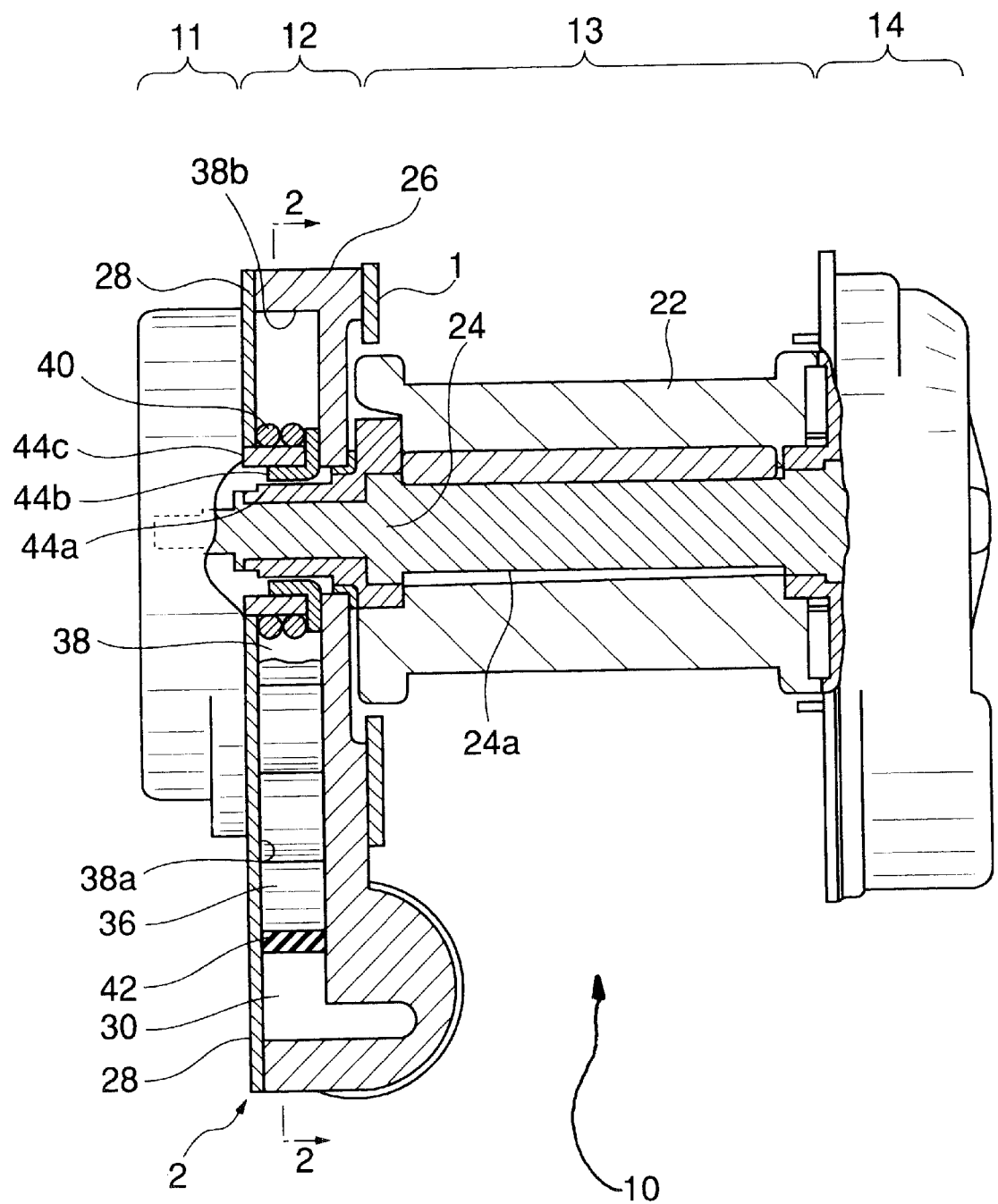
FIG. 1 is a partially sectional view of a retractor device in a seat belt system in accordance with the first embodiment of the present invention, as viewed from its axial outside.

Now, a seat belt system equipped with a retractor including a pretensioner in accordance with a first embodiment of the present invention will be described with reference to the drawings. Throughout the drawings, corresponding portions are designated by identical reference numerals, omitting any double description.

Figure 2:
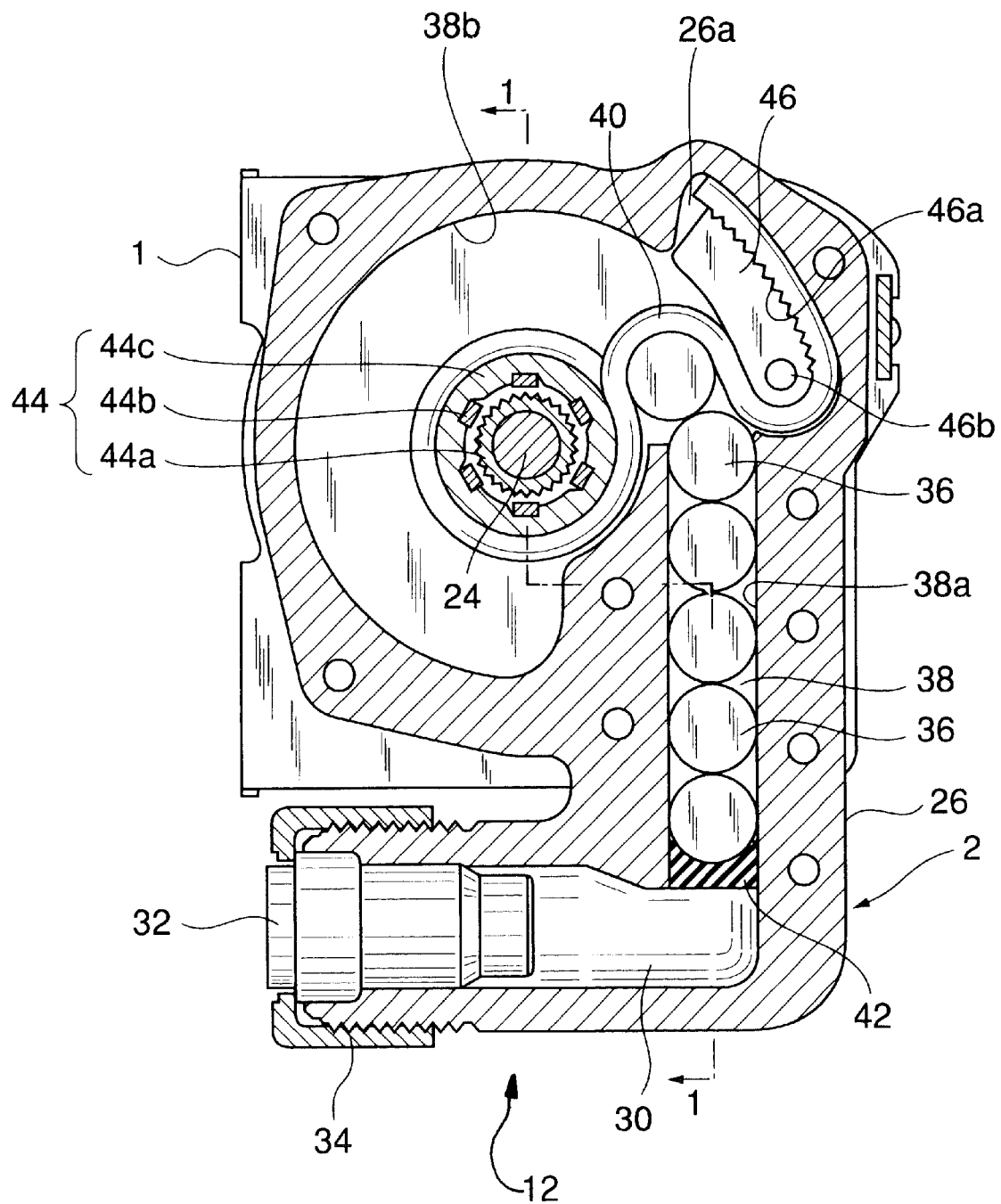
FIG. 2 is a sectional view for explaining a pretensioner disposed in the retractor device.

Referring to FIGS. 1 and 2, a retractor 10 for use with a seat belt system in accordance with the first embodiment of the present invention comprises a retractor body 13 for winding up a webbing (not shown), an emergency lock mechanism 14, a pretensioner 12, and a take-up spring device 11. The emergency lock mechanism 14 is disposed at one axial end of the retractor body 13, and the pretensioner 12 and the take-up spring device 11 are in turn disposed at the other end thereof.

The retractor body 13 includes a retractor base 1 formed substantially in a square U-shape as viewed from above in FIG. 1, and a take-up reel 22 rotatably supported by the retractor base 1 for freely winding up or winding out the webbing. The take-up reel 22 includes a retractor shaft 24 as a take-up spindle and is constantly biased in a webbing-winding direction by the take-up spring device 11 connected to the retractor shaft 24. Further, if the webbing is to be wound out with acceleration of a predetermined value or more, the emergency lock mechanism 14 connected to one axial end of the retractor shaft 24 is actuated to prevent rotation of the retractor shaft 24, thus inhibiting the webbing to be wound out.

A portion of the retractor shaft 24 which is contained in the take-up reel 22 is designated by a torsion bar 24a. As disclosed in U.S. Pat. No. 3,741,494, etc., the torsion bar 24a, to which an excess force is applied after the emergency lock mechanism is actuated, is twisted and plastically deformed. This allows the take-up reel 22 that is connected thereto in a relatively non-rotatable manner to rotate in a webbing winding-out direction through a sleeve 44a at the left of the take-up reel 22 as viewed in FIG. 1.

A casing 2 of the pretensioner 12 is formed by air-tightly press-fitting a plate 28 used as a lid into a housing 26 fixed to the retractor base 1. The casing 2 contains a built-in mechanism for forcibly winding up the webbing to eliminate slack of the webbing owing to abrupt deceleration in the event of a vehicular collision, etc. The structure of this mechanism will be described hereinafter.

Now, turning to FIG. 2, a pressure chamber 30 is disposed across the lower portion of the housing 26. A pressure-applying device 32 is inserted into one end of the pressure chamber 30, and is mounted thereto by externally threading a cap 34 into the housing 26. The pressure-applying device 32 can be a pressurized gas generator of a laterally disposed type, comprising a not-shown electrode, igniter, and high-pressure gas generating agent. To the electrode is connected an ignition signal transmitting harness for transmitting a signal from a shock sensor for detecting abrupt acceleration due to a vehicular collision. If an ignition signal is transmitted to the electrode from the shock sensor, the igniter ignites the high pressure gas generating agent, instantaneously causing a high pressure gas.

A moving element passage 38 extending upward beyond the upper portion of the other end of the pressure chamber 30 is formed in the housing 26. The moving element passage 38 includes a straight path (cylinder) portion 38a extending in a tangential direction of the retractor shaft 24, and a circumferential path 38b extending about the retractor shaft 24. A plurality of rotary elements 36 serving as moving elements are arranged in a row within the straight path portion 38a. The straight path portion 38a is formed into a rectangle in section, as viewed in a direction orthogonal to a moving direction of the rotary elements 36.

Figure 8:
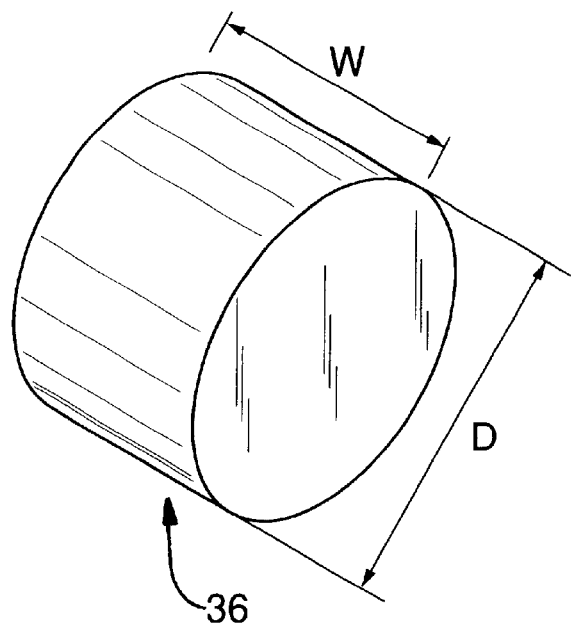
FIG. 8 is an explanatory diagram for explaining the rotary elements.
Figure 9:
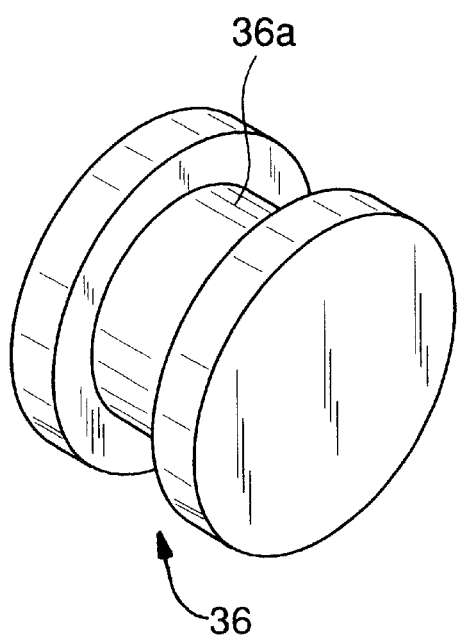
FIG. 9 is an explanatory diagram for explaining an example of the top rotary element.

Preferably, each rotary element 36 is shaped into a cylinder (tube) having a width W narrower than diameter D (D>W), for example, as shown in FIG. 8. Hence, the straight path portion 38a is formed into a rectangle in section with smaller in dimension extending longitudinally of the retractor shaft 24 so that it may conform to the configuration of the rotary element 36. Preferably, as shown in FIG. 9, the top rotary element 36 is formed with an engaging groove 36a to be engaged with a tension member 40 described later.

Beneath the bottom rotary element 36 is disposed a pushing member 42 tightened against the straight path portion 38a for pushing the rotary element 36 by using a gas pressure. The pushing member 42 has an outer profile slightly greater than the inner profile of the straight path (cylinder) portion 38a prior to the assembling stage so that gas leakage can be prevented.

Figure 3:
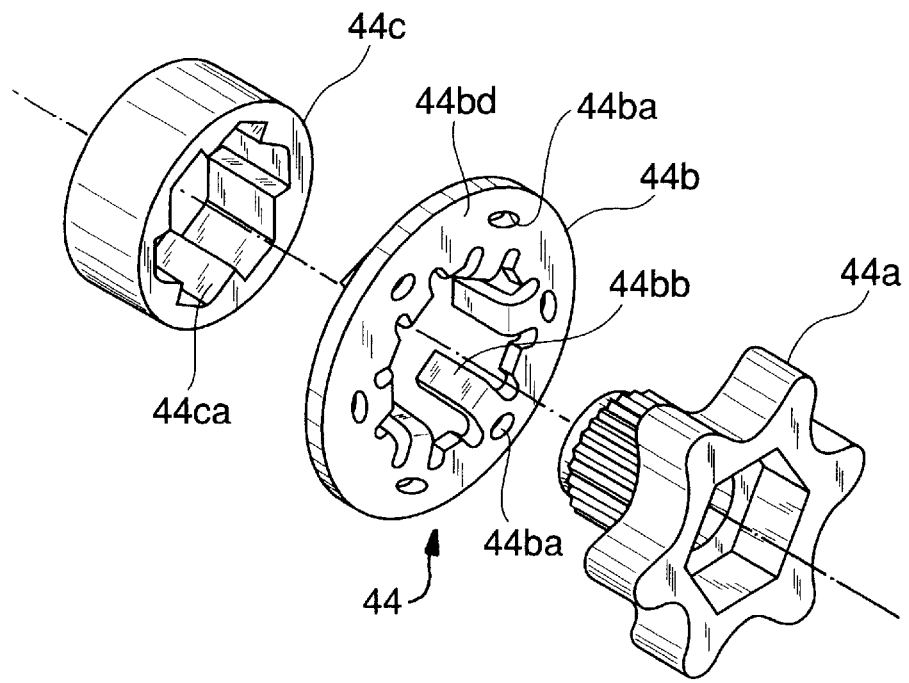
FIG. 3 is an exploded perspective view for explaining a clutch mechanism used for the pretensioner.

A clutch mechanism 44 is mounted onto the retractor shaft 24 for winding up the webbing. The clutch mechanism 44 comprises a sleeve 44a, a plate 44b and a pulley 44c, which are coaxially aligned with one another, as shown in FIG. 3.

The plate 44b includes a plurality of projections (fingers) 44bb that are axially bent, and holes 44ba from which the projections 44bb extend so that the projections 44b can be easily deformed. The sectional configuration of each of the projections (fingers) 44bb bent beyond the plate 44b is a rectangle in the illustration, but it can be chosen from various shapes such as circle, ellipse or curve (arc), if appropriate.

In FIGS. 1 and 2, the sleeve 44a is mounted at the left end of the retractor shaft 24 (as viewed in FIG. 1) and is connected to the reel 22 in a relatively non-rotatable manner. A multiple of knurls surrounding the axis (retractor shaft 24) are axially formed in the surface of the sleeve 44a which faces the pulley 44c, developing a mesh power when the projections 44bb of the plate 44b is brought into contact therewith.

The tension member 40 is mounted along the outer periphery of the pulley 44c, and cam surfaces 44ca are formed in the inner periphery of the pulley 44c. The cam surfaces 44ca face the knurls of the sleeve 44a via the projections 44bb of the plate 44b. The plate 44b is held by an inertia body, frictional retention, a shearing pin(s), etc., resulting in rotational delay relative to the pulley 44c and thus a phase difference. In one example, the plate 44b is held on to the housing 26 with a certain frictional force.

Figure 4:
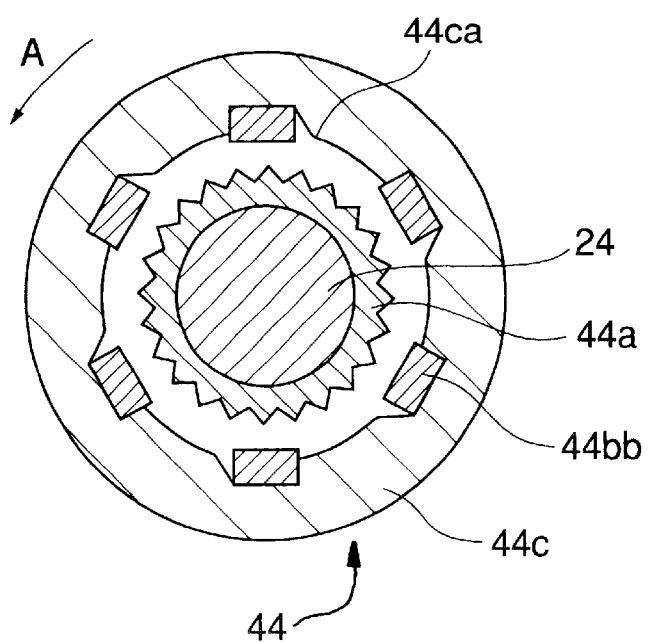
FIG. 4 is an explanatory diagram for explaining an initial state of the clutch mechanism.
Figure 5:
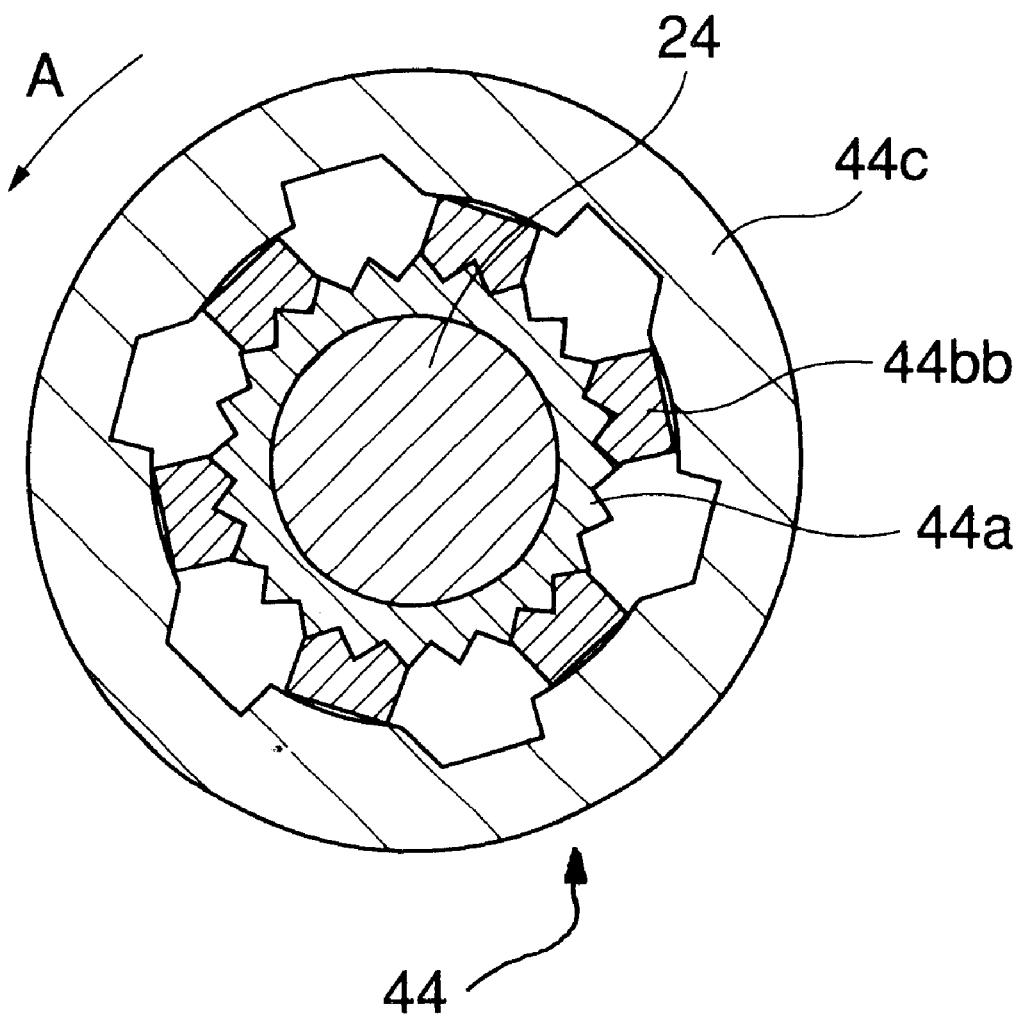
FIG. 5 is an explanatory diagram for explaining an operational (connection) state of the clutch mechanism.

FIGS. 4 and 5 are explanatory diagrams for explaining the operation of the clutch mechanism 44. Referring now to FIG. 4, as the pulley 44c rotates counterclockwise relative to the plate 44b, the cam surfaces 44ca of the pulley 44c urge the projections 44bb to be bent toward the axis and engaged with the knurls of the sleeve 44a. Then, in FIG. 5, the projections 44bb are made intermediate between the inner surface of the pulley 44c and the knurls of the sleeve 44a so that rotation of the pulley 44c can be transmitted to the retractor shaft 24 via the projections 44bb and the sleeve 44a. Therefore, the webbing can be wound up.

The pulley 44c in the clutch mechanism 44 has an outer diameter smaller than the outer diameter of the reel 22. The tension member 40 is wound around substantially two turns on the outer peripheral surface of the clutch mechanism 44 (pulley 44c), serving as a speed-increasing mechanism. The tension member 40 is a linear member or a band member, and is made of a metal material or the like having a predetermined length and width, such as wire, rope or cable. One end of the tension member 40 is fixed to the outer peripheral surface of the pulley 44c by not-shown hooks, screws, spot welding, etc. The tension member 40 is wound around plural turns (for example, substantially two turns shown in FIG. 1) counterclockwise as viewed in FIG. 2. Thereafter, the other end of the tension member 40 is passed across the moving element passage 38, and inserted and fixed to a clamp 46 in accommodation space 26a of the housing 26.

The clamp 46 is an elongated member extending circumferentially, including an inner surface that defines a part of the circumferential path 38b of the moving element passage 38, and an outer surface on which a retention portion 46a made up of a series of teeth is formed to hook the tension member 40. The lower end of the clamp 46 is rotatably fixed by a pin 46b while the upper end of the clamp 46 is movably swung like a pendulum.

As described above, the plurality of cylindrical rotary elements 36 are inserted in a row within the straight path portion 38a of the moving element passage 38 so as to be in contact with one another and free to rotate. As is seen from FIG. 2, the top one of the plural rotary elements 36 is positioned between the side surface of the clamp 46 and the clutch mechanism 44. The tension member 40 wound around on the clutch mechanism 44 is brought into contact with the side surface of the top rotary element 36 and turned around halfway thereon, introduced between the rotary element 36 and the inner side of the clamp 46 into the outer surface of the clamp 46 from the lower end of the clamp 46. The tension member 40 is then clamped and fixed between the retention portion 46a of the clamp 46 and the housing inner wall.

Figure 6:
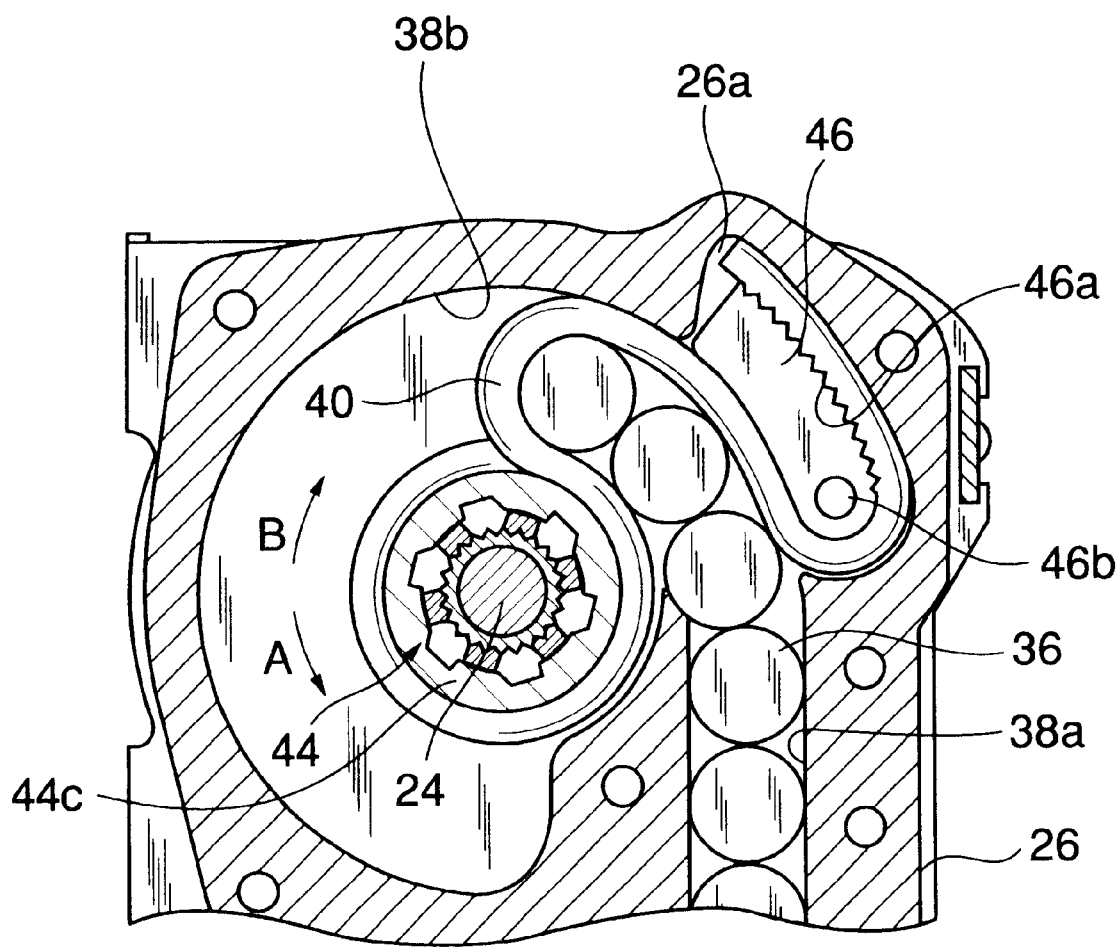
FIG. 6 is an explanatory diagram illustrating movement of rotary elements and the operation of the clutch mechanism.

If some strong pressure is applied to the bottom rotary element 36 in the rotary element row via the pushing member 42, the pressure is in turn transmitted to the opposite rotary elements 36, so that the plural rotary elements 36 can be moved in a row as a whole within the straight path portion 38a of the moving element passage 38. Referring to FIG. 6, when the rotary elements 36 move in a row from the straight path portion 38a to the circumferential passage 38b, the top rotary element 36 pushes the tension member 40 and advances along the circumferential orbit of the circumferential passage 38b defined between the outer periphery of the clutch mechanism 44 and the inner periphery of the housing 26. In other words, the interior of the housing 26 has a circumferential groove defined by the outer periphery of the clutch mechanism 44 in communication to the straight path portion 38a of the moving element passage 38, according to necessity. The rotary elements 36 travel along the thus defined circumferential groove.

The operation in accordance with the present embodiment will now be described. When initially an occupant wears the webbing on a seat in a vehicle, the pretensioner 12 is in an initial state as shown in FIG. 2. In this initial state, since the projections 44bb of the plate 44b and the sleeve 44a are spaced from each other, the clutch mechanism 44 is by no means associated with the pretensioner 12 where the webbing is wound out by the take-up spring device 11 and freely wound up.

It is assumed in this initial state that abrupt deceleration occurs on a vehicle due to a collision or the like. Then, the pressure-applying device 32 instantaneously produces a pressurized gas, which is then emitted into the pressure chamber 30. The pushing member 42 is affected by an abrupt pressing force from below, causing the rotary element row as a whole to be instantaneously pushed upward from the straight path portion 38a of the moving element passage 38.

This pushing force is superior in the initial state to a force of the tension member 40 with which the rotary element row is retained. In FIG. 6, the rotary element row moves toward the circumferential passage 38b while pushing the middle of the tension member 40 extending across the moving element passage 38. More specifically, a straight movement that facilitates to move the rotary element row in the straight passage 38a is transitioned to a circumferential movement along the circumferential orbit of the circumferential passage 38b.

Now, one end of the tension member 40 is fixed to the outer periphery of the pulley 44c in the clutch mechanism 44 while the other end thereof is wound around at least one turn on the pulley 44c and then fixed to the clamp 46. The tension member 40 is pushed by the rotary element row that transitions to the circumferential movement to wind in a tension member portion arranged on the outer periphery of the clutch mechanism 44 by the pushing amount, i.e., the length two times the moving distance of the rotary element row. This allows the pulley 44c in the clutch mechanism 44 to be rotated by the angle corresponding to the winding-in amount. In other words, the tension member 40 employs a so-called "well-bucket" fashion to develop two-fold speed-increasing effects, causing the pulley 44c constituting the outer periphery of the clutch mechanism 44 to be rotated in the direction indicated by an arrow A in FIG. 6 with increased speed.

This produces a deviation in the rotational direction between the pulley 44c and the plate 44b, causing the plurality of cam surfaces 44ca on the inner periphery of the pulley 44c to deform and inwardly extrude the plural projections 44bb of the plate 44b, respectively. The projections 44bb are meshed into the sleeve 44a, leading to engagement in the clutch mechanism 44 (see FIG. 5). As a result, the speed-increasing mechanism (or the pretensioner 12) represented by the tension member 40 is coupled to the retractor shaft 24 to also rotate the retractor shaft 24 in the direction indicated by an arrow A together with rotation of the clutch mechanism 44.

As the circumferential movement of the rotary element row proceeds, a winding-in amount by the tension member 40 is increased, accelerating rotation of the retractor shaft 24. A rotational torque of the retractor shaft 24 forces the take-up reel 22 of the webbing which is engaged with the retractor shaft 24 to be rotated so that the webbing is wound up in an extremely short time. Now, since the outer diameter of the pulley 44c in the clutch mechanism 44 is smaller than the outer diameter of the reel 22 as described above, the winding-in amount by the tension member 40 is amplified, which becomes a webbing-winding amount.

When the webbing-winding operation has been completed and thereafter the webbing is wound out as the occupant moves in the event of a collision, the take-up reel 22 is caused to rotate in the webbing winding-out direction. This rotation is transmitted to the retractor shaft 24 via the sleeve 44a, and the shaft 24 then rotates in the webbing winding-out direction. Now, the emergency lock mechanism prohibits the right portion of the shaft 24, as viewed in FIG. 1, from rotating in the webbing winding-out direction, causing the torsion bar 24a to be twisted and plastically deformed as described above.

As the retractor shaft 24 rotates in the webbing winding-out direction, the pulley 44c coupled to the retractor shaft 24 rotates in the reverse direction (the direction indicated by an arrow B in FIG. 6). This allows the tension member 40 to be wound up (wound around) on the outer periphery of the pulley 44c to push back the rotary elements 36 to the initial position via the tension member 40.

Figure 7:
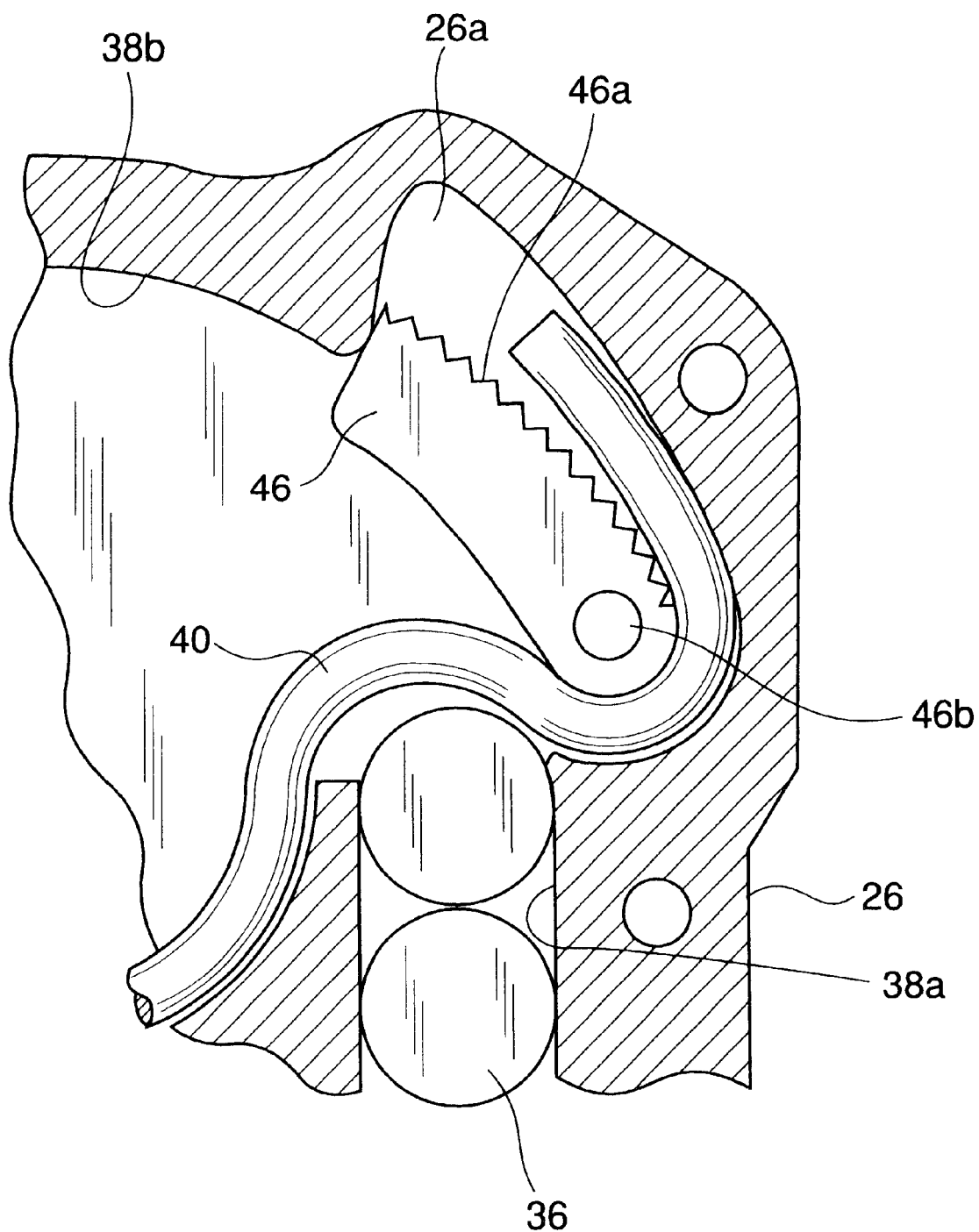
FIG. 7 is an explanatory diagram for explaining a returning position of the rotary elements and clamp-releasing of a clamp.

In FIG. 7, if the rotary elements 36 are further pushed back exceeding the initial position of the rotary elements 36 shown in FIG. 2, any biasing force exerted on the clamp 46 by the rotary elements 36 is eliminated, so that the upper end of the clamp 46 can be swung, releasing the clamp 46. When the one end of the tension member 40 is disengaged from the clamp 46, nothing restrains rotation of the clutch mechanism 44 to permit any further rotation of the retractor shaft 24 coupled to the clutch mechanism 44. Therefore, the plastic deformation caused by further twisting the torsion bar 24a makes it possible to absorb energy in the event of a collision acting to the occupant.

Hence, the seat belt system ensures safety and freedom of the occupant on the seat by tightening the webbing in a short time in case of detecting any excess acceleration, followed by releasing the tightened webbing.

Figure 10:
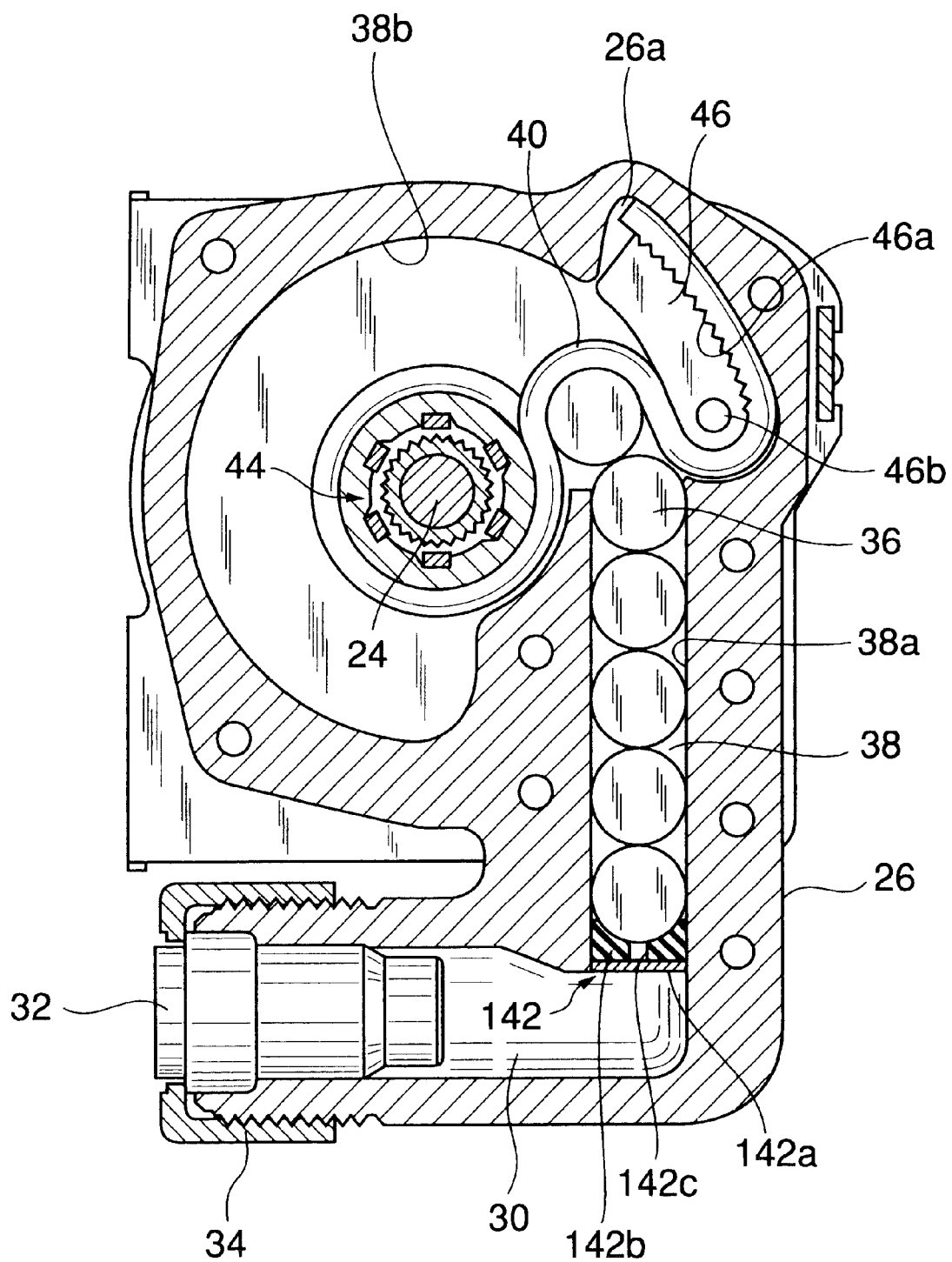
FIG. 10 is a sectional view for explaining (the initial state in) the second embodiment of the present invention in which the pushing member is modified.
Figure 11:
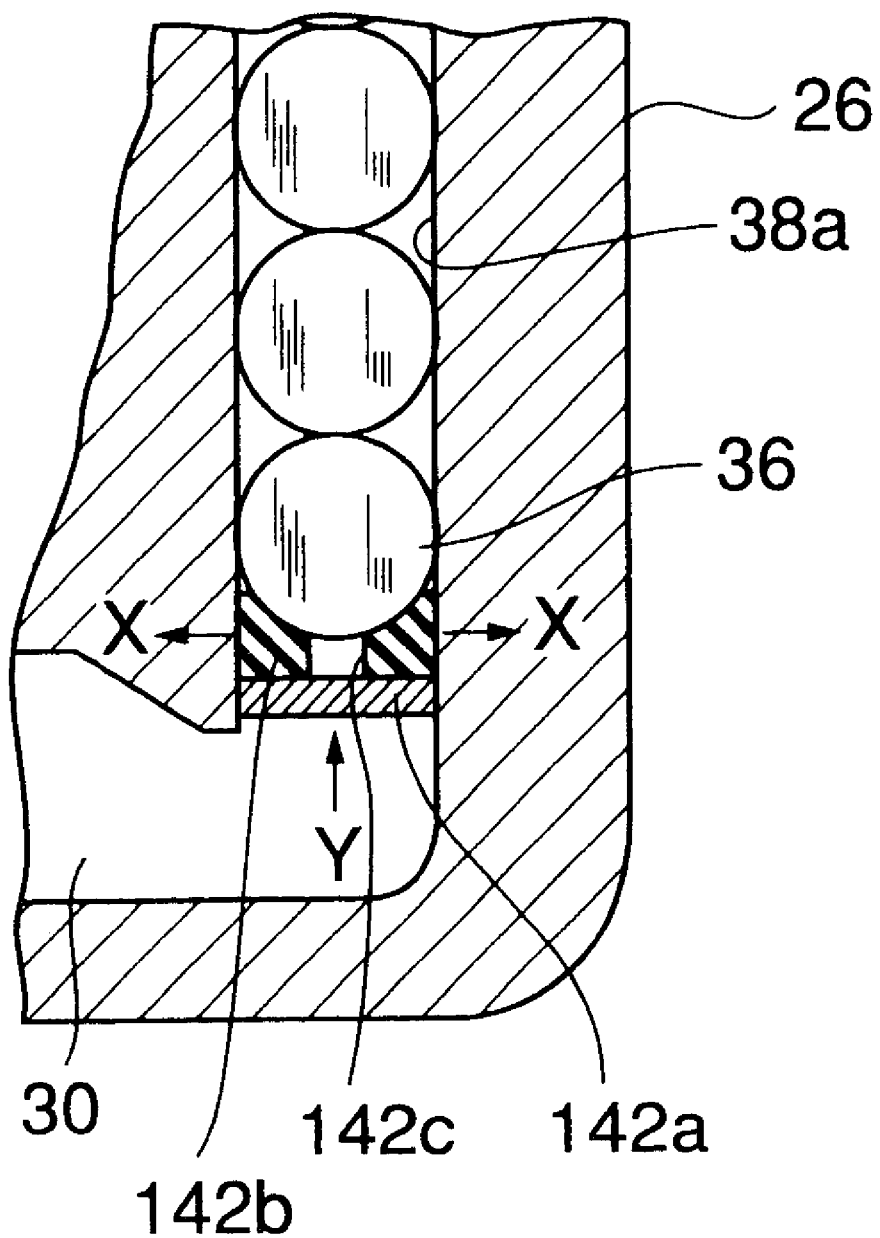
FIG. 11 is a sectional view for explaining the operational state in the second embodiment of the present invention.

FIGS. 10 and 11 illustrate a second embodiment of the present invention in which the pushing member is modified. The straight path portion 38a for passing the rotary elements 36 is taken as a cylinder using the pushing member 42 as a piston, serving to maintain a gas pressure to move the rotary elements. According to the present embodiment, the pushing member 142 can be deformed to enhance a sealing property against gas leakage within the straight path portion 38a when the rotary elements 36 move.

In the embodiment illustrated in FIG. 10, the pushing member 142 is shaped into a rectangle to correspond to a cylinder having a rectangular section, comprising a piston (plate) 142a and a seal member 142b. A hole 142c is formed in the center of the seal member 142b. This is to easily deform inward the outer periphery of the seal member 142b at the initial assembling stage so that tightness can be more liable against the inner peripheral surface of the straight path portion 38a. The seal member 142b is made of resilient or elastic material such as rubber or resin. The piston 142a prefers a rigid material (rigid member) such as iron or hard plastic to that of the seal member 142b.

As is shown in FIG. 10, the seal member 142b is tightened against the bottom rotary element 36 in the initial state. However, when a gas pressure is generated, the piston 142a is pushed upward (in the direction indicated by an arrow Y) as depicted in FIG. 11 and tightened against the rotary element 36. The rotary element 36 has an arc at its lower portion, causing a force component of the push-up force to be laterally produced, so that the seal member 142b is flared in the direction indicated by an arrow X in FIG. 11 (outwardly) and is deformed. This allows the seal member 142b to be more tightened against the cylinder wall surface to improve a gas-sealing property. The rotary element 36 pushed by the seal member 142b is caused to move upwardly within the straight path portion 38a.

While the pushing member is implemented using both the piston 142a and the seal member 142b in the second embodiment, the pushing member may comprise only the seal member 142b as in the first embodiment. The hole 142c is occupied by the rotary element 36, which is operable in the same manner as in the present embodiment.

Figure 12:
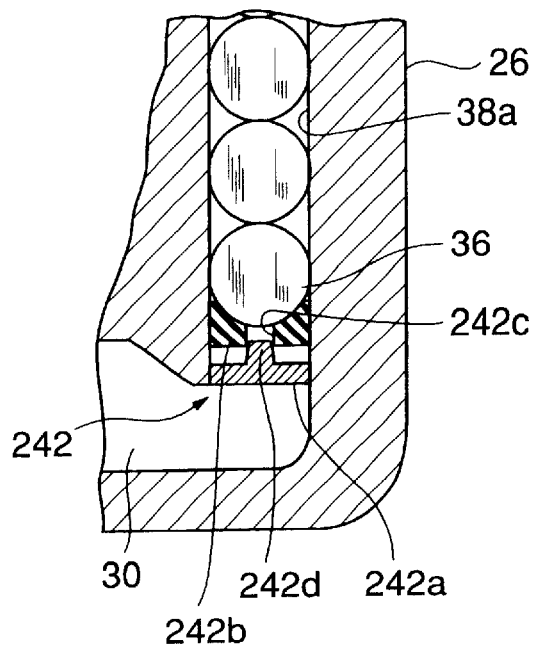
FIG. 12 is a sectional view for explaining the initial state in the third embodiment of the present invention in which the pushing member is further modified.
Figure 13:
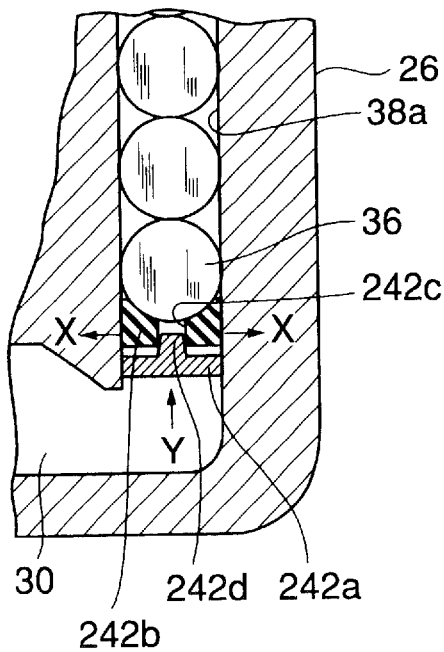
FIG. 13 is a sectional view for explaining the operational state in the third embodiment of the present invention.

FIGS. 12 and 13 illustrate a third embodiment of the present invention in which the pushing member is further modified. According to the present embodiment, as shown in FIG. 12, the pushing member 242 includes a piston 242a, a projection part (conical frustum) 242d with a taper, and a seal member 242b having a hole 242c formed in the center. The projection part 242d is formed at the center of the piston 242a and is brought into contact with the lower side of the seal member 242b. The inner diameter of the hole 242c is set narrower than the outer diameter of the base of the projection part 242d.

When a gas pressure is generated, the piston 242a is pushed upward as depicted in FIG. 13 and the projection part 242d is forced into the hole 242c in the seal member 242b. The inclined surface of the projection part 242d allows the seal member 242b to be forcibly flared in the direction indicated by an arrow X in FIG. 13 (outwardly). This increases tightness of the seal member 242b against the cylinder wall surface to improve a gas-sealing property. Since the seal member 242b is forcibly flared by a rigid member, more liable tightness can be expected. It is to be noted that the projection part may be of any truncated pyramid such as triangular pyramid or pyramid, and any projection having a taper can be expected to have the same effects.

With the thus constructed seal mechanism, dimensional accuracy and the like will not be greatly affected to attain large air-tightness, while making it possible to effectively utilize a gas pressure.

Figure 14:
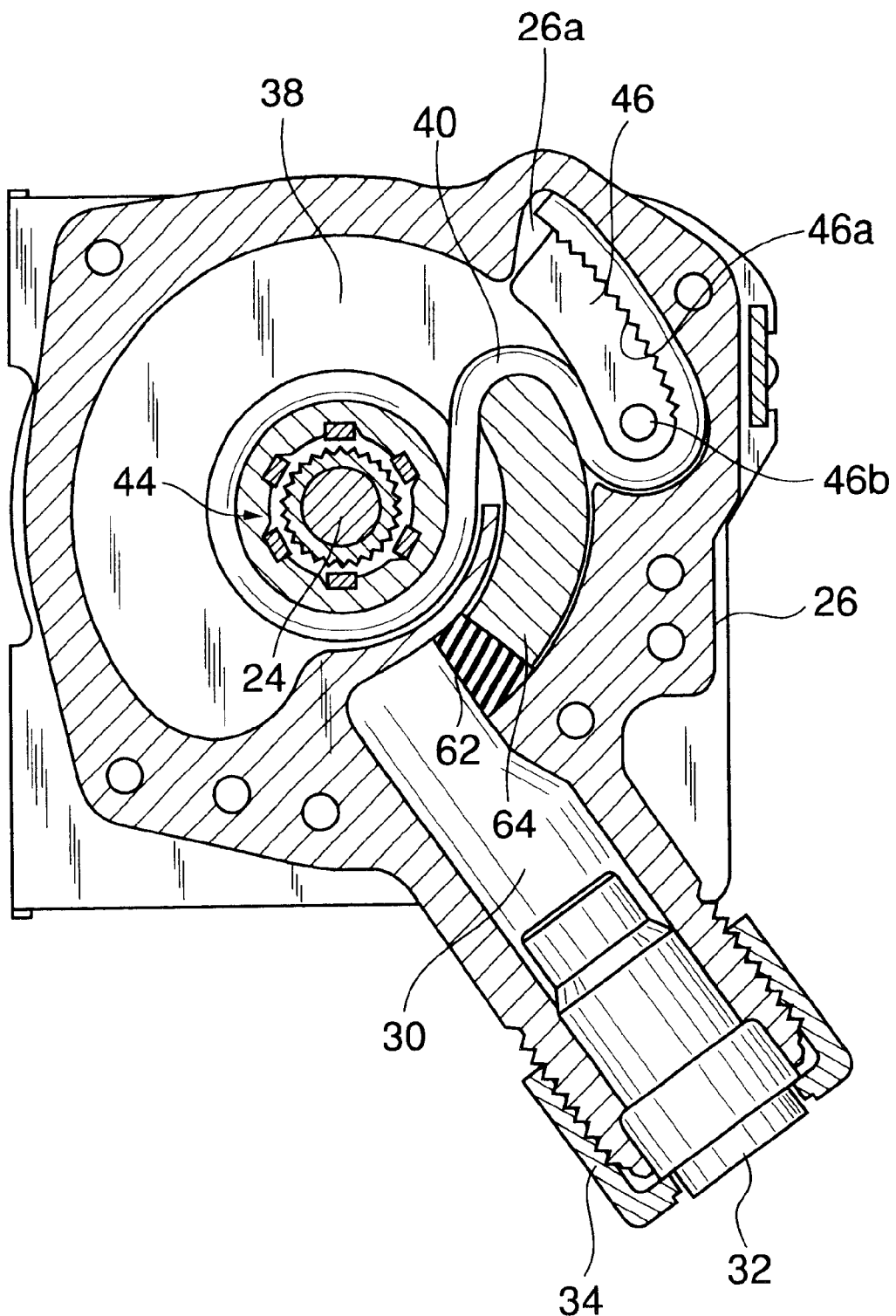
FIG. 14 is a sectional view for explaining the fourth embodiment of the present invention in which a single moving element is used.
Figure 15:
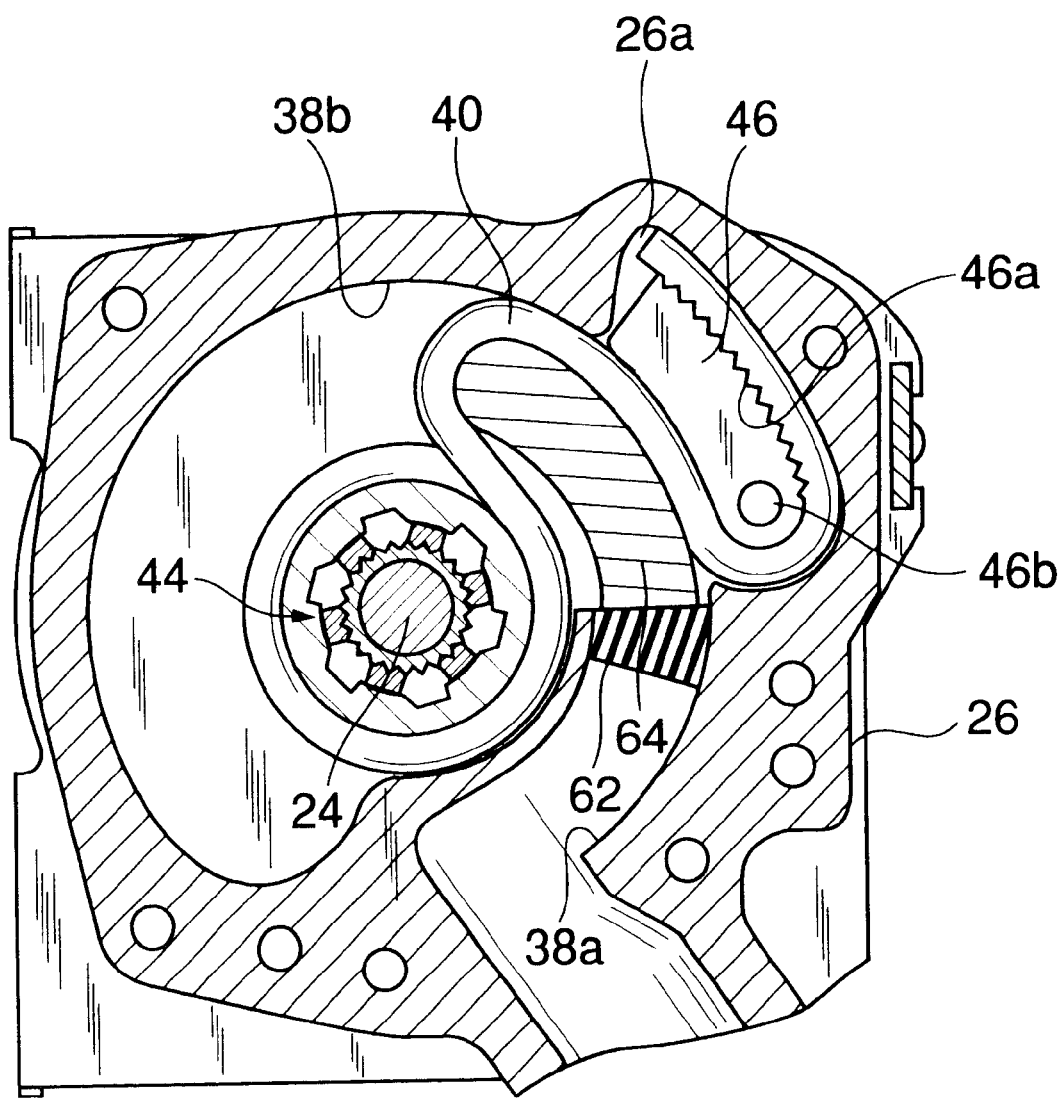
FIG. 15 is an explanatory diagram for explaining an example in which the pretensioner according to the fourth embodiment of the present invention is actuated.
Figure 16:
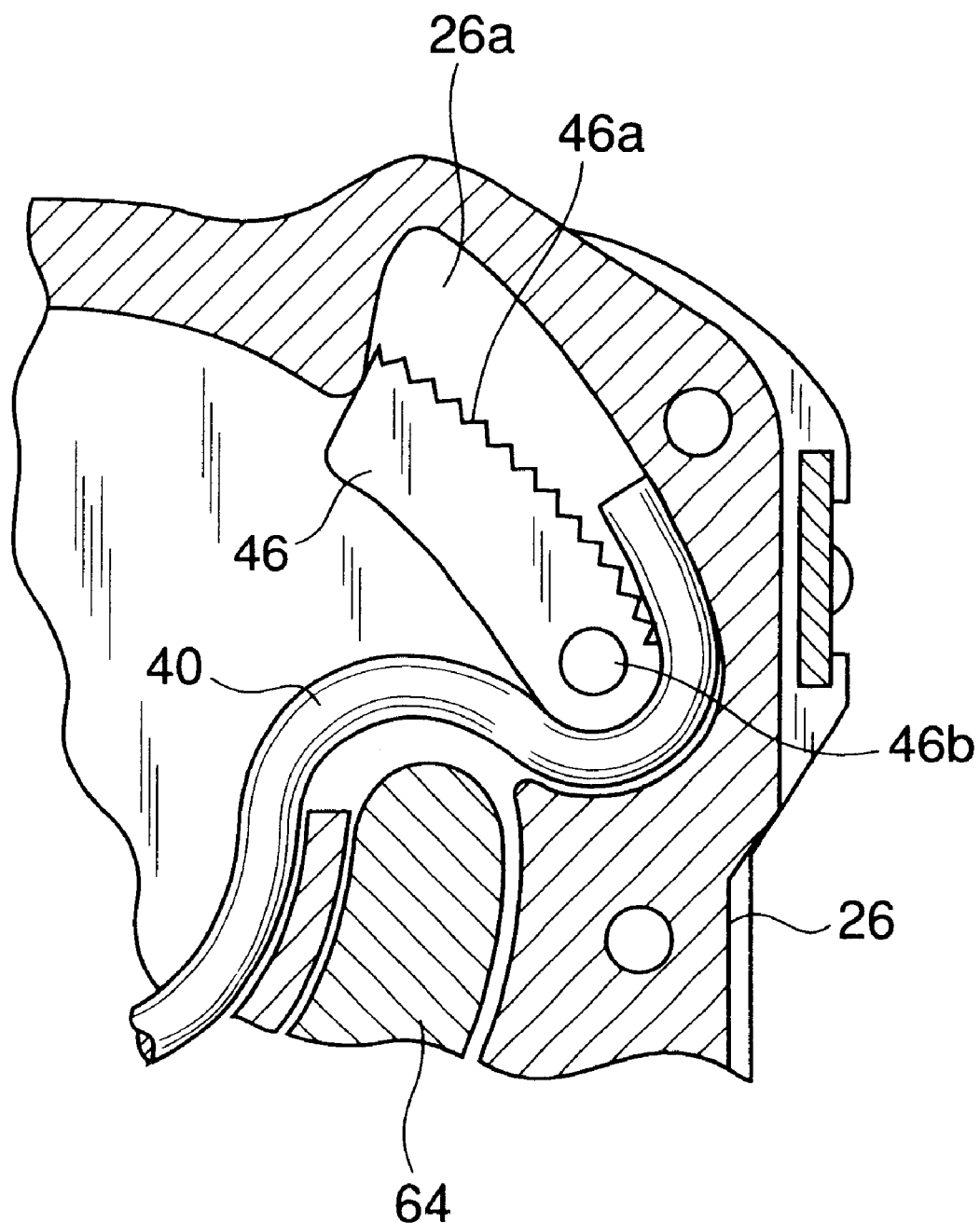
FIG. 16 is an explanatory diagram for explaining the clamp-releasing state attained by the moving element.
Figure 17:
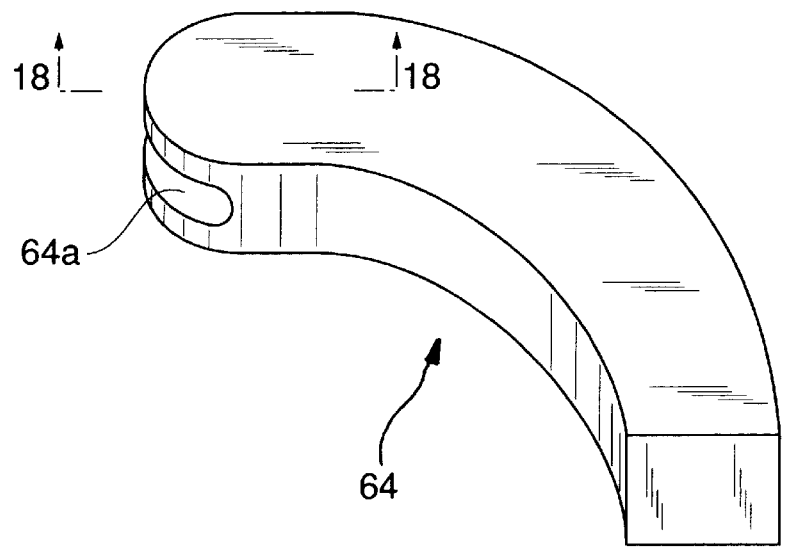
FIG. 17 is an explanatory diagram for explaining the moving element according to the fourth embodiment of the present invention.
Figure 18:
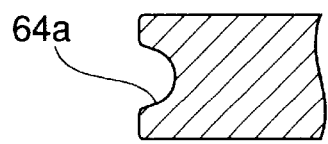
FIG. 18 is a partially sectional view for explaining the moving element.

FIGS. 14 to 20 illustrate a fourth embodiment of the present invention in which the moving element is further modified. According to the present embodiment, as shown in FIG. 14, the moving element passage 38 is originated from the pressure chamber 30 and the entire passage is circumferential of the clutch mechanism 44. As seen in FIG. 17, a single moving element (curved rod) 64 having an inner surface and an outer surface which are shaped into arc and also having a rectangle in section is adapted to fit the moving element passage 38. As shown in FIG. 18 that is a sectional view taken along a line 18—18 of FIG. 17, a groove 64a with which a tension member 40 is to be engaged is formed at the tip of the moving element 64.

Figure 19:
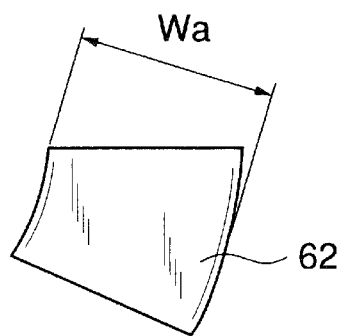
FIG. 19 is an explanatory diagram for explaining an exemplified dimension of the pushing member.
Figure 20:
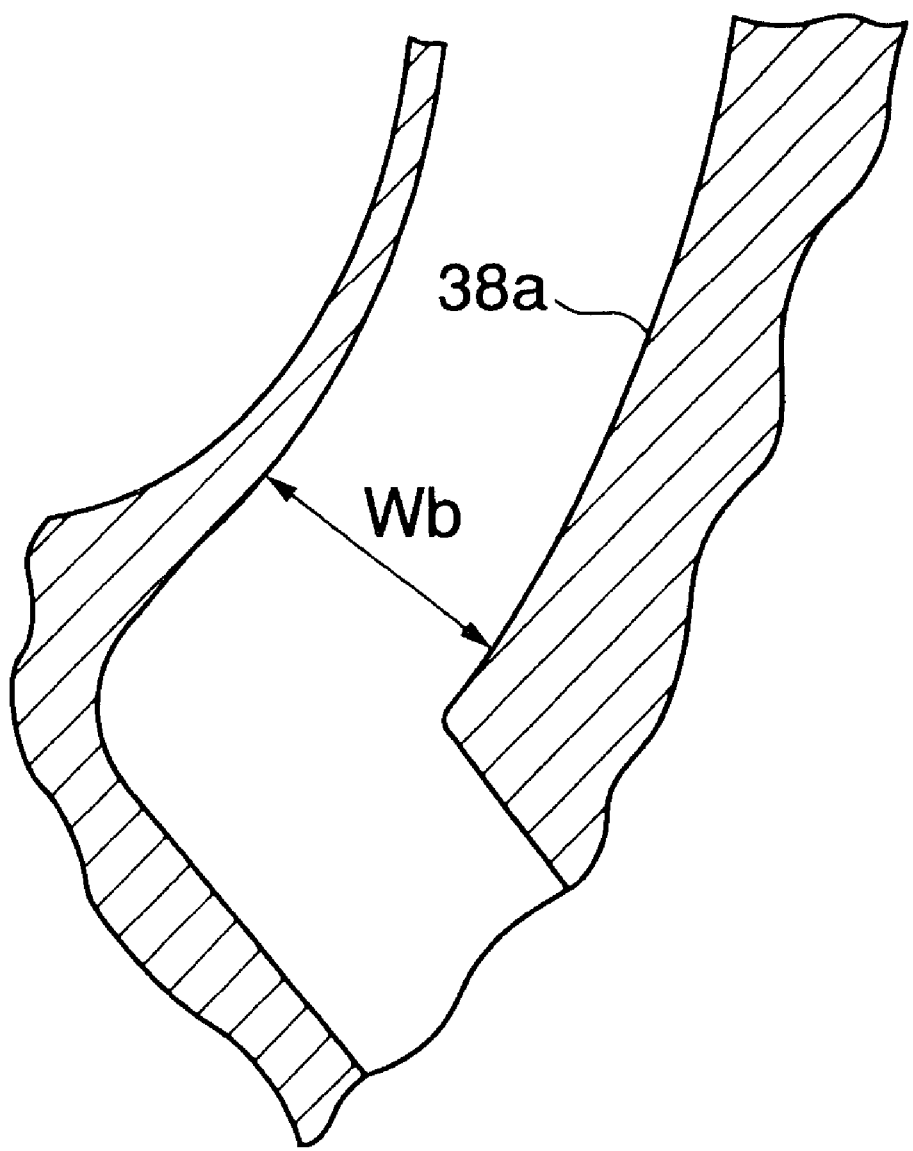
FIG. 20 is an explanatory diagram for explaining an exemplified dimension of the circumferential passage for the moving element.
Figure 21:
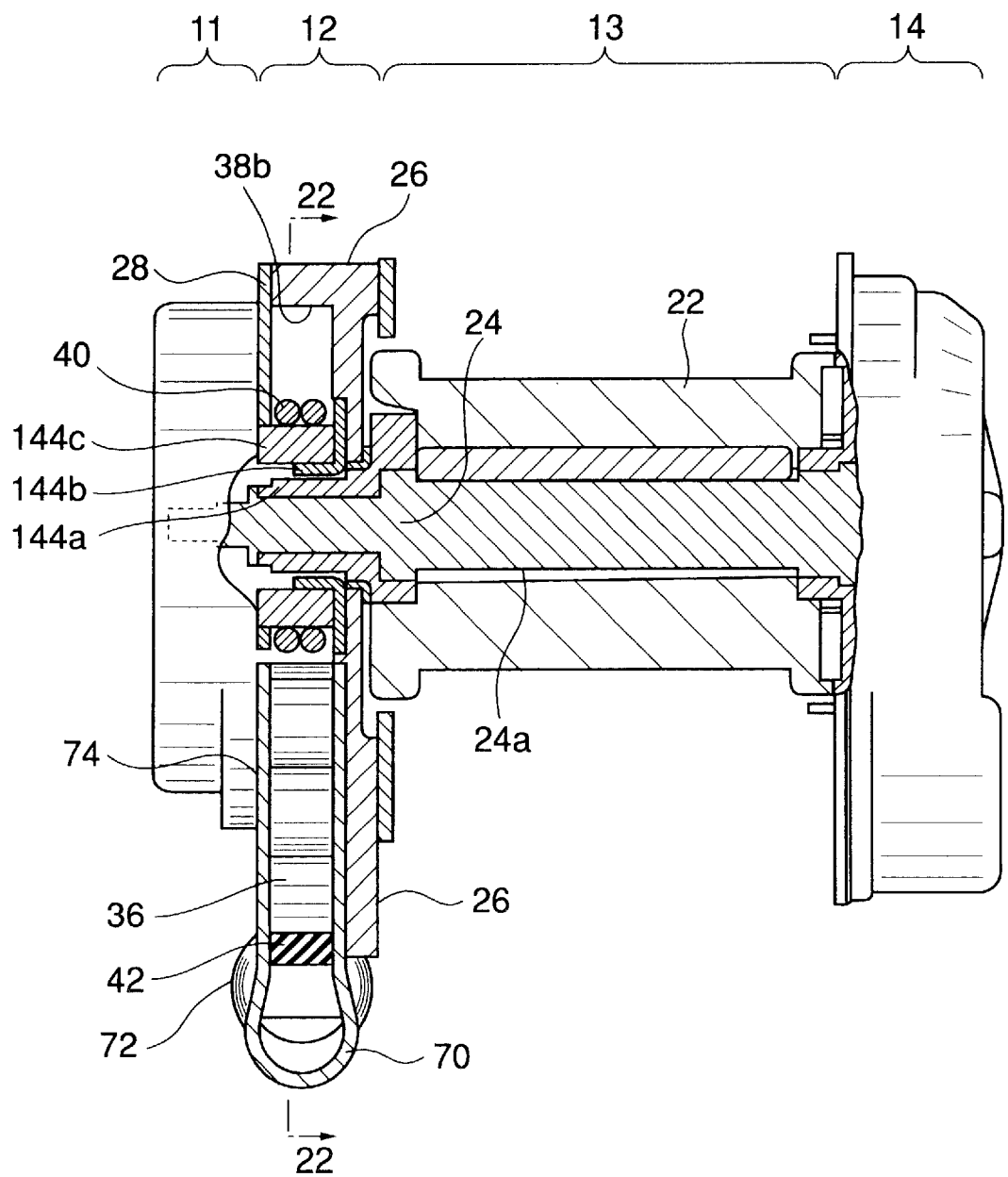
FIG. 21 is a partially sectional view showing the fifth embodiment of the present invention in which a pipe is employed for the pretensioner in the retractor device, as viewed from its axial outside.

The pushing member 62 is abutted against the trailing edge of the moving element 64. The pushing member 62 serves to prevent gas leakage within a cylinder section 38a and to push upward the moving element 64. The pushing member 62 has an inner surface and an outer surface which are shaped into an arc, and also is rectangular in section. As seen in FIGS. 19 and 20, the pushing member 62 has a width Wa slightly larger than the width Wb of the moving element passage 38 prior to the assembling stage. Therefore, the pushing member 62 is tightened against the passage wall, thus improving a sealing property.

Referring to FIG. 15, a gas pressure causes the moving element 64 to move from the initial position shown in FIG. 14. Then, the tension member 40 wound around on the pulley is wound out to rotate the pulley, activating the clutch mechanism 44. The pulley and the shaft are connected to each other. The same operation is made as a pretensioner as in the aforementioned embodiments, omitting description thereof.

In FIGS. 14 and 16, a clamp 46 has not been released and has been already released, respectively. Similarly to the embodiment with reference to FIGS. 2 and 7, when the moving element 64 is returned to a position lower than an initial position, any biasing force exerted on the clamp 46 by the moving element 64 is eliminated to release the clamp 46. The tension member 40 is removed, so that the retractor shaft 24 can be free to rotate.

The pretensioner in accordance with the embodiments of the present invention employs a unique structure which has not been known in the art in which a moving element (either a row of the moving elements 36 or the single moving element 64) is combined with a speed-increasing mechanism represented by the tension member 40 in a "well-bucket" fashion. Therefore, a shorter stroke of the cylinder section 38a (see FIGS. 15 and 20) is required to accommodate the moving element(s). As a result, the pretensioner can be downsized as a whole to loosen a vehicle-loading condition. Furthermore, an excellent sealing property of the pushing member enables the machining process of the moving element passage to be simplified with low production costs.

Referring now to FIGS. 21 to 31 illustrated is a fifth embodiment of the present invention. Portions of the fifth embodiment which correspond to those of the first embodiment are designated by the same reference numerals, omitting description of those portions.

According to the fifth embodiment, an L-shaped pipe 70 is employed as the passage 38 for the rotary elements 36 in the pretensioner 12. This embodiment will be described with reference to FIGS. 21 to 23.

Figure 23:
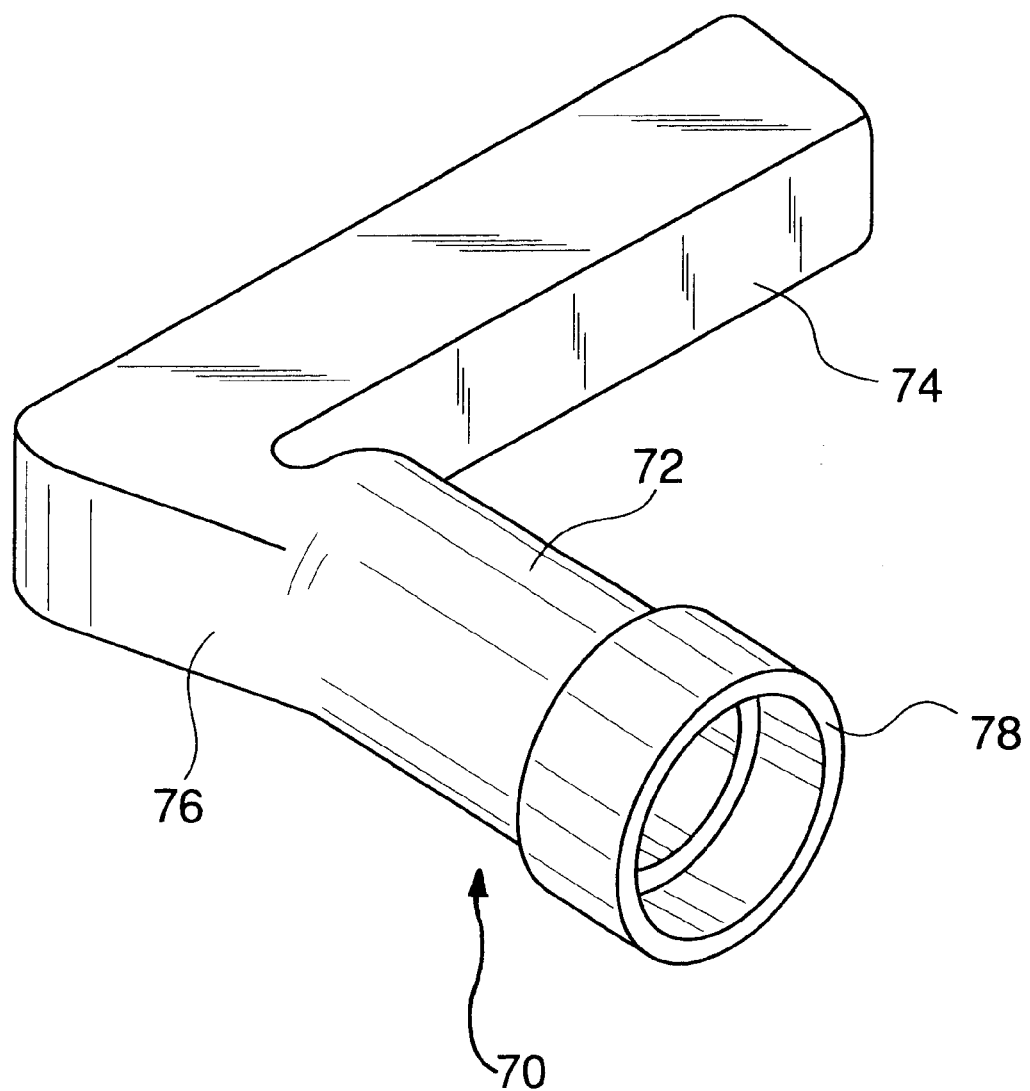
FIG. 23 is a perspective view for explaining the pipe of an L-shape.

As shown in FIG. 23, in the present embodiment, the L-shaped pipe 70 is comprised of a cylindrical pipe 72 and a square column pipe 74, with the both pipes connected to each other via a constriction part 76. The constriction part 76 includes a deeply constricted upper portion 76a and a gently tapered lower portion 76b. The pipe 70 is integrally mounted on the housing 26 by welding or the like. As is apparent from FIG. 21, the lid 28 does not cover the pipe 70 so that dimension of the retractor extending longitudinally of the retractor shaft 24 may be reduced. The gas generator 32 is engagingly inserted into one end 78 of the pipe 72 and mounted thereto by caulking the end 78. The gas generator 32 may be mounted by means of threading or using a cap.

The pipe 74 accommodates the multiple rotary elements 36 on the pushing member 42. The pushing member 42 is a resilient body resistant to heat.

Figure 24A:
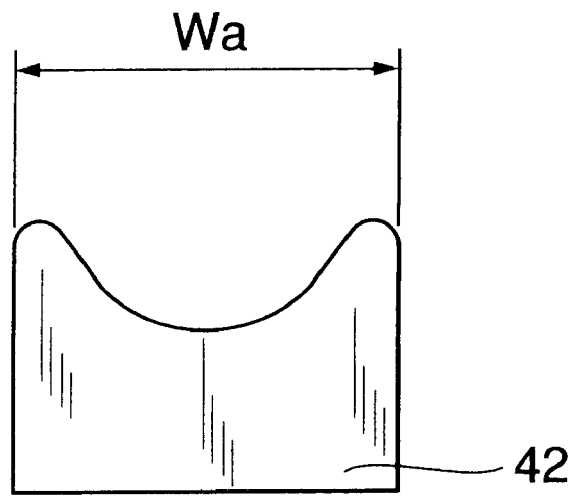
FIGS. 24A and 24B are explanatory diagram s for explaining a dimensional relation between the pushing member and the pipe.
Figure 24B:
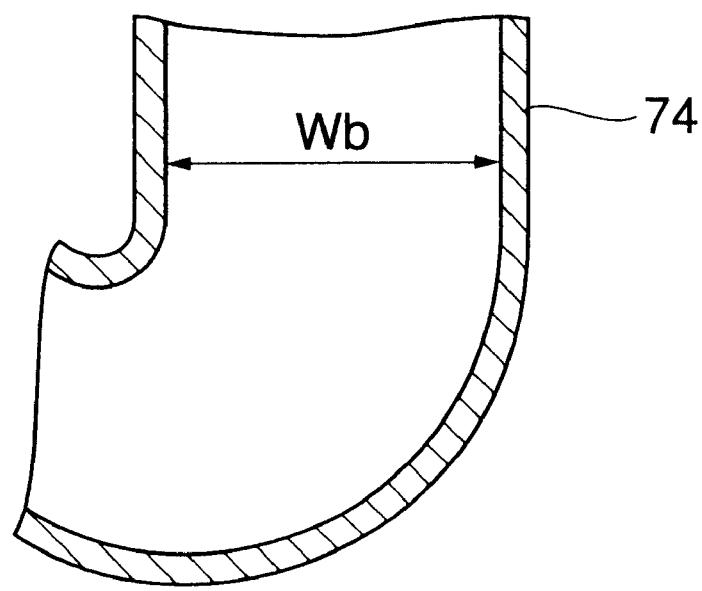

As seen in FIGS. 24A and 24B, the outer diameter (lateral width) Wa of the pushing member 42 is slightly larger than the inner diameter (lateral width) Wb of the pipe 74 (Wa>Wb). This brings the pushing member 42 into tight engagement with the inner wall of the pipe (cylinder) 74 to prevent gas leakage.

Figure 25:
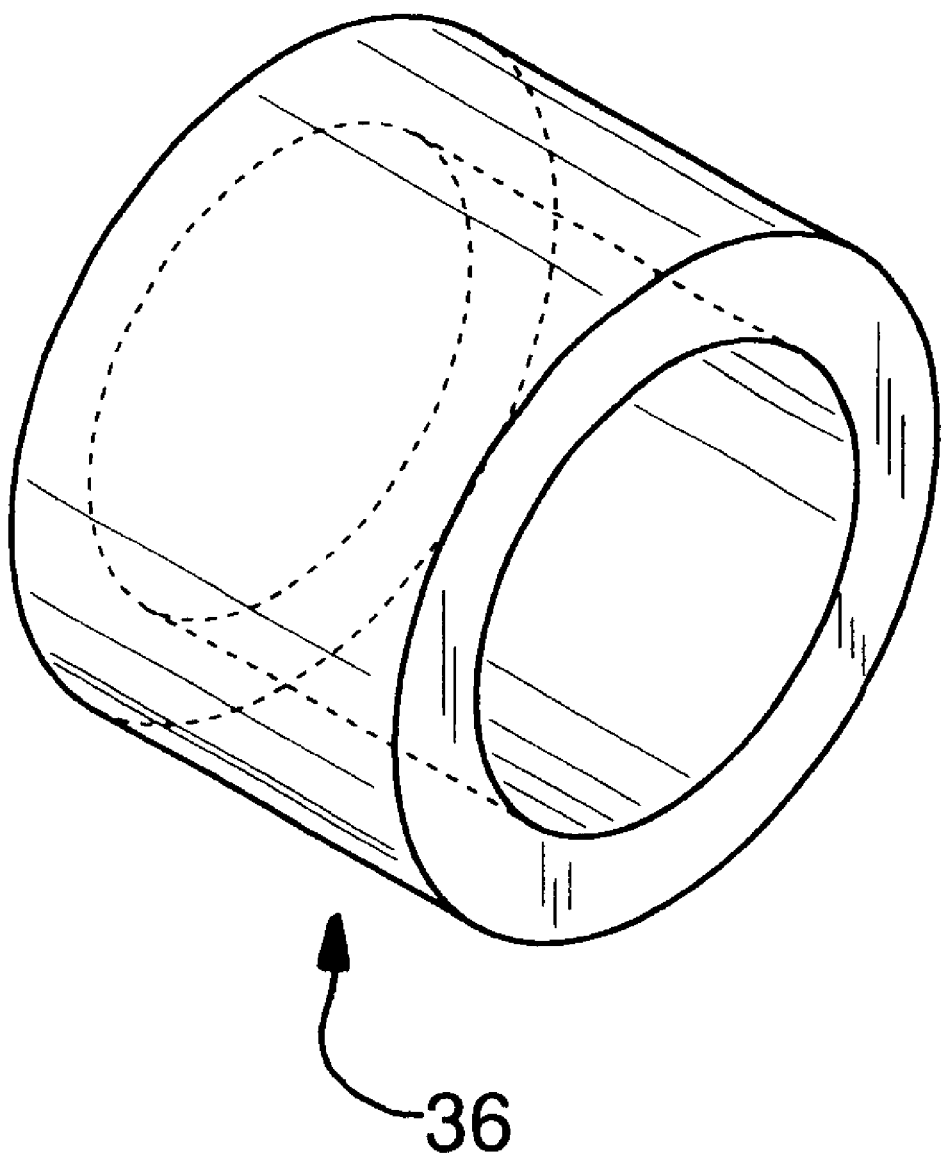
FIG. 25 is a perspective view showing an example in which a hollowed (cylindrical) roller is employed as the rotary element.

Each of the rotary elements 36 is cylindrical as described above (see FIG. 8), but can be hollowed to be light in weight a illustrated in FIG. 25. The top rotary element 36 that is to be engaged with the tension member 40 may include an engaging groove 36a as described above with reference to FIG. 9.

Figure 22:
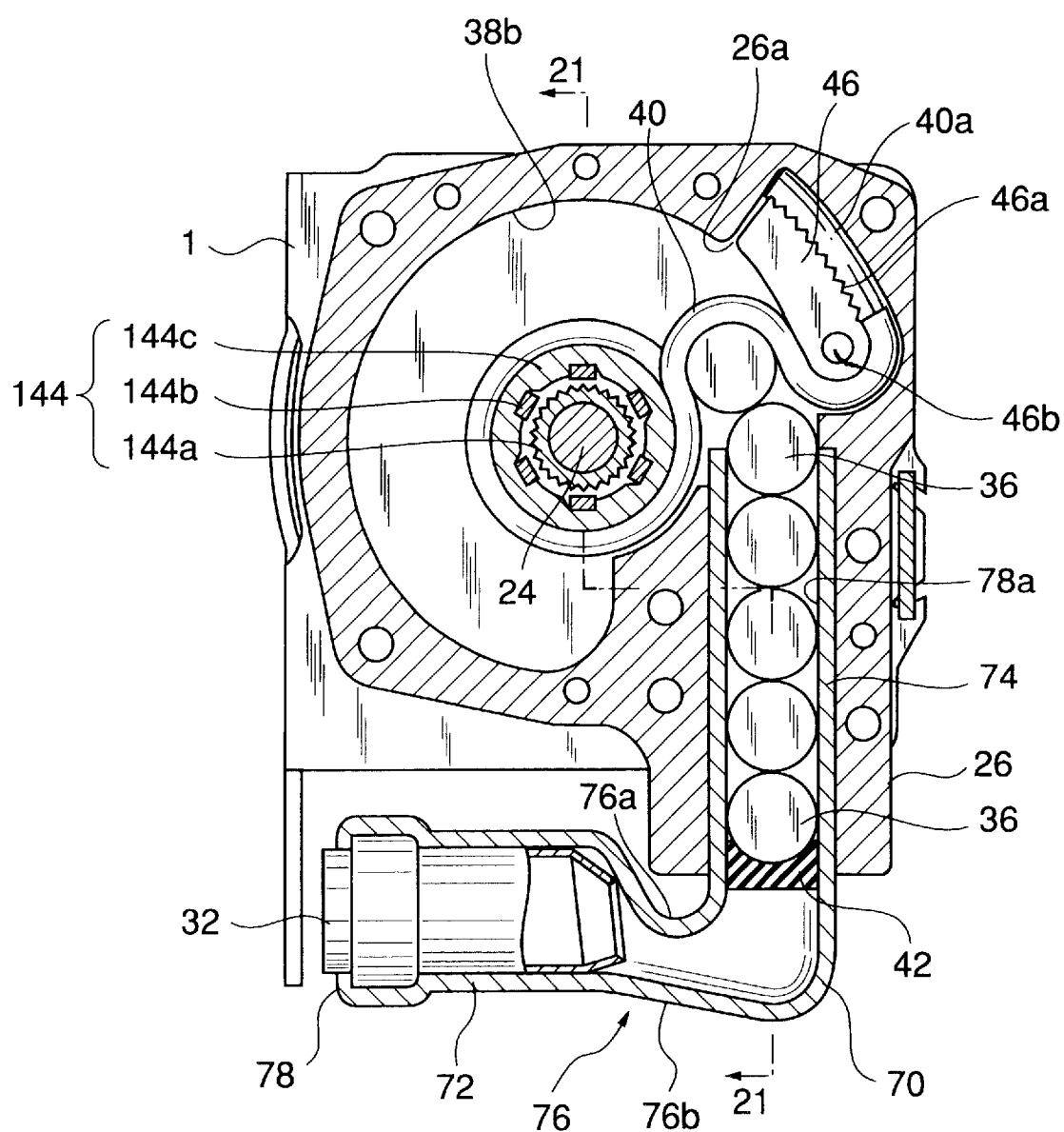
FIG. 22 is a sectional view showing the fifth embodiment of the present invention.

As shown in FIG. 22, one end (illustrated with cast coating 40a) of the tension member 40 is fixed to the housing 26 by the clamp 46 in an initial state. The clamp 46 is rotatably pivoted to the housing 26 through an axis 46b at its lower end. The outer periphery of the clamp 46 includes a plurality of teeth 46a so that the tension member 40 can be easily fixed to the housing 26. One end of the tension member 40 is covered by a thin cast coating so that the plurality of teeth 46a of the clamp 46 can be easily engaged with the one end of the tension member 40 via the coating 40a. The one end of the tension member 40 is caused to extend along the outer periphery of the clamp 46 to rotate the clamp 46 clockwise, and the tension member 40 is then fixed.

Accordingly, a combination of the gas generator and the rotary element passage (rotary element accommodation part) is made by an L-shaped pipe, thereby facilitating to produce the housing 26. Furthermore, the pretensioner 12 can be more downsized.

FIGS. 26 to 30 illustrate a clutch mechanism. The present embodiment employs shearing pins 26ca.

Figure 26:
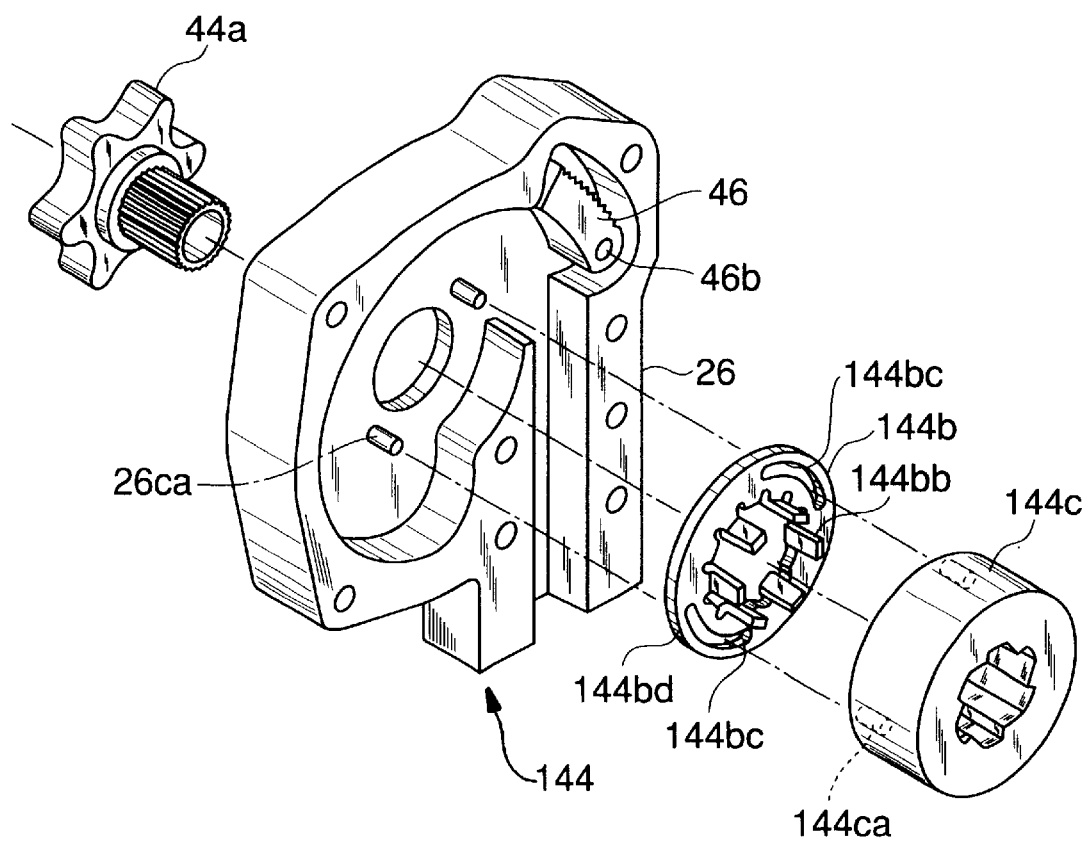
FIG. 26 is an exploded perspective view for explaining the clutch mechanism.
Figure 27:
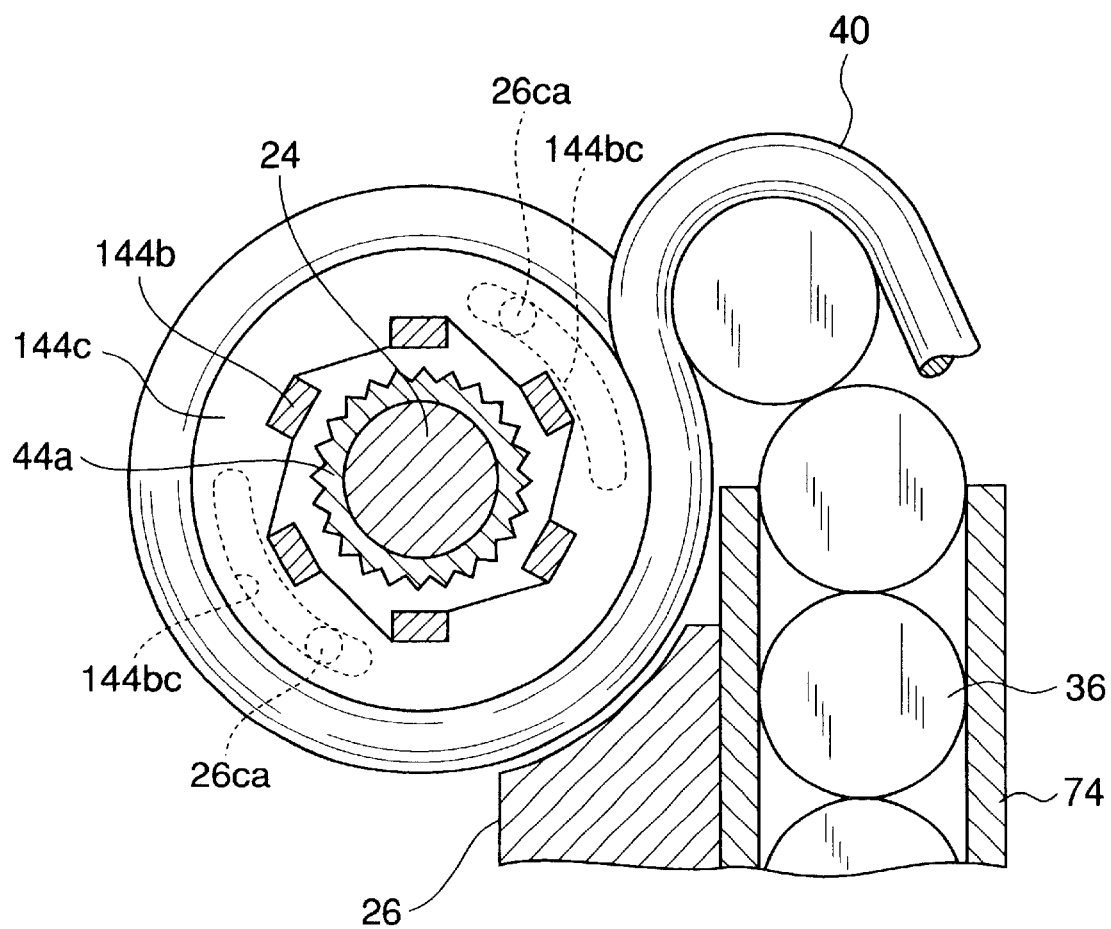
FIG. 27 is an explanatory diagram for explaining the operation of the clutch mechanism.
Figure 28:
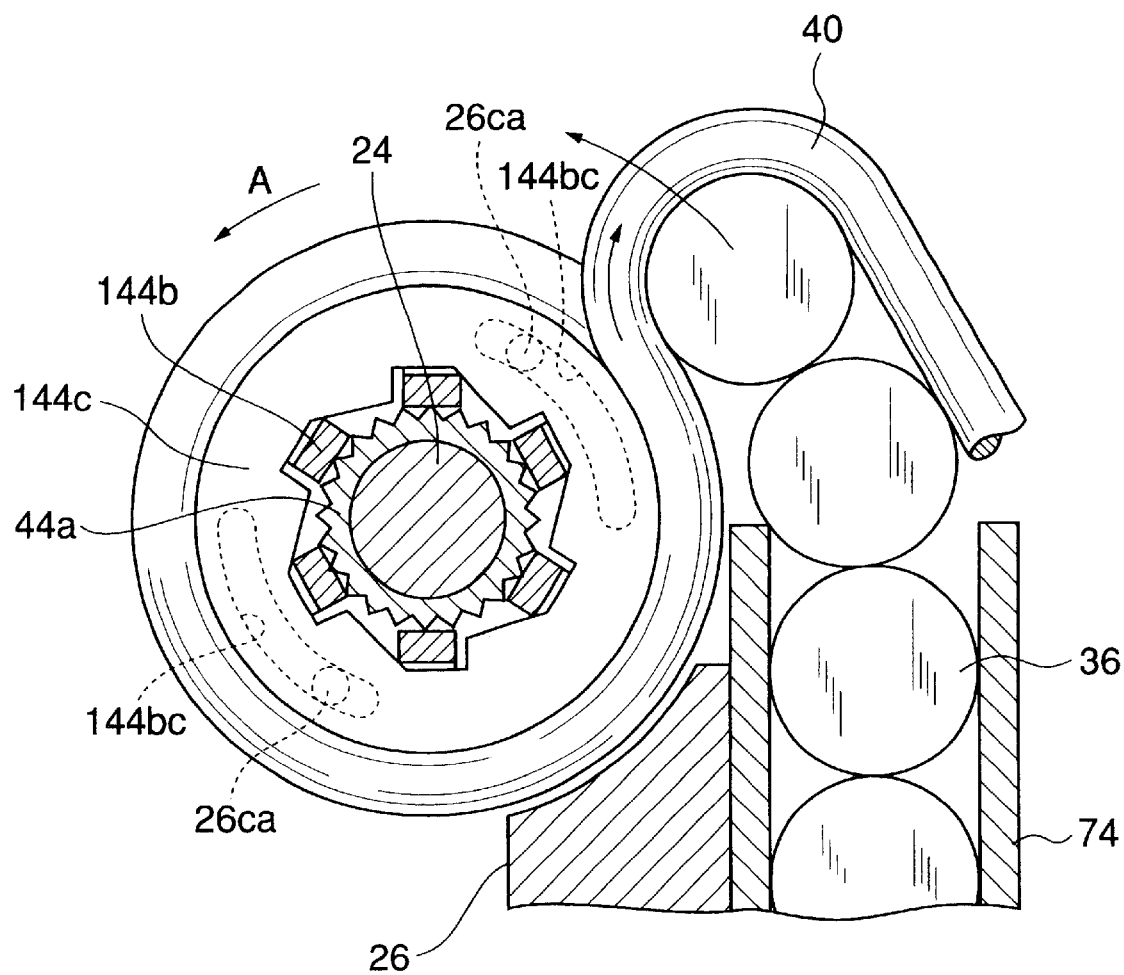
FIG. 28 is an explanatory diagram for explaining the operation of the clutch mechanism.
Figure 29:
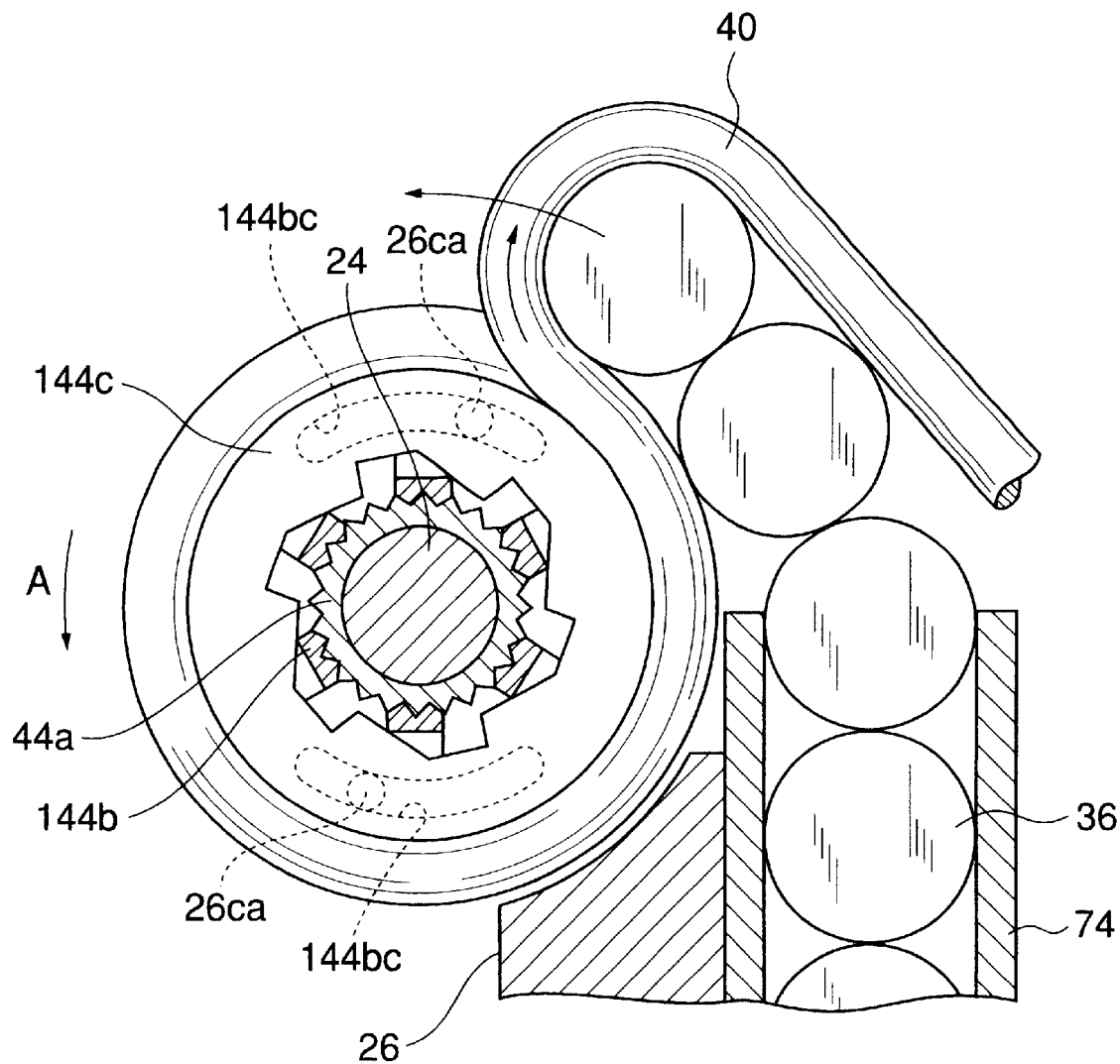
FIG. 29 is an explanatory diagram for explaining the operation of the clutch mechanism.
Figure 30:
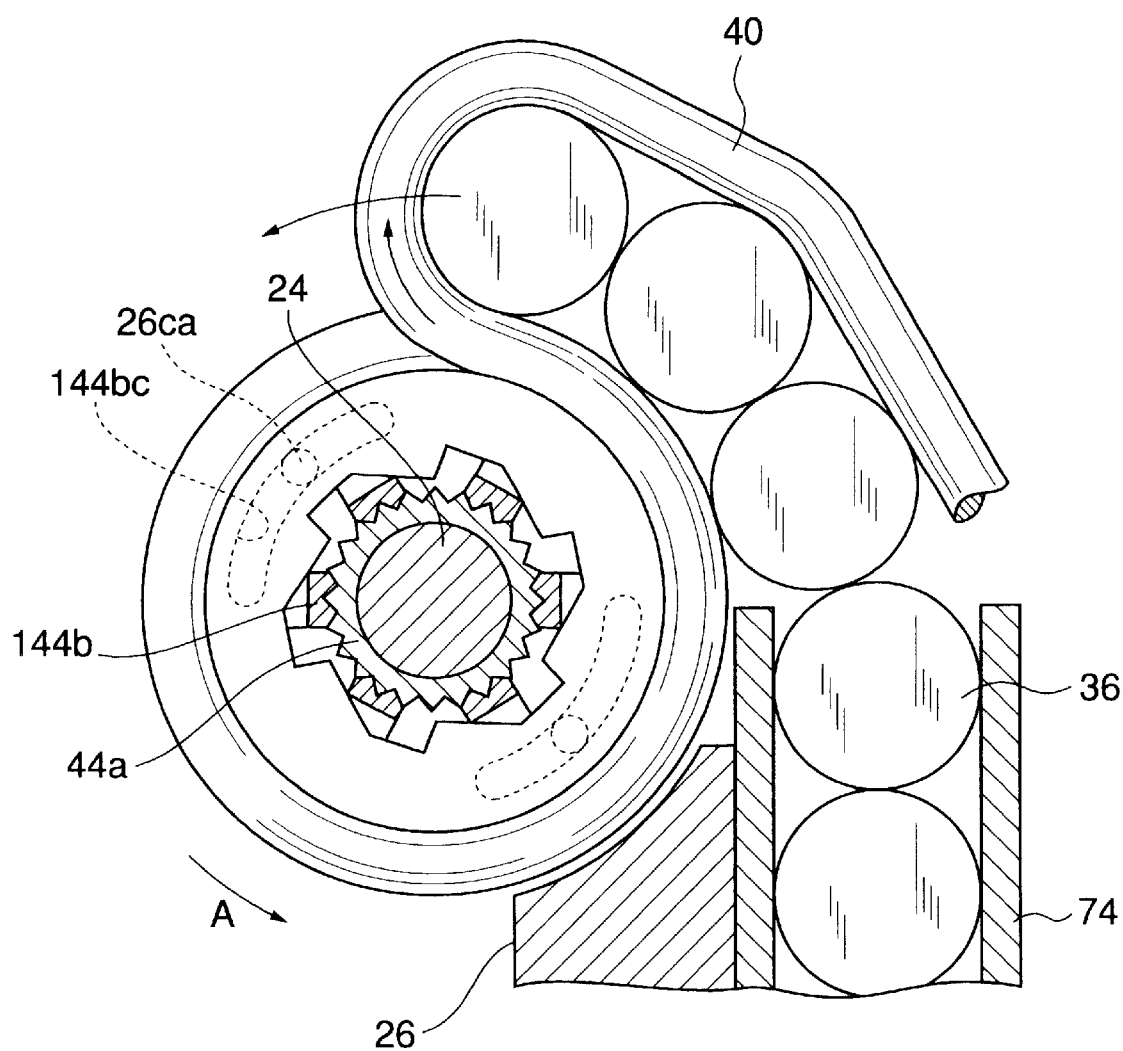
FIG. 30 is an explanatory diagram for explaining the operation of the clutch mechanism.

As seen in FIG. 26, the clutch mechanism 144 comprises a sleeve 44a adapted to be fitted into the retractor shaft 24, a plate 144b coaxially aligned therewith, and having projections (fingers) 144bb facing the peripheral surface of knurls on the sleeve 44a, and a pulley 144c having a cam surface part in its inner periphery capable of receiving the projections (fingers) 144bb. The shearing pins 26ca are provided on the wall of the housing 26 which forms clutch accommodation space. The shearing pins 26ca are engaged with holes 144ca in the pulley 144c through elongated holes 144bc in the plate 144b. The shearing pins 26ca determine the position of the pulley 144c. In the initial state where the pretenoioner 12 is not operable, the projections (fingers) 144bb and the knurls on the sleeve 44a are spaced from each other, as shown in FIG. 27, so that the pulley 144c and the retractor shaft 24 are not mechanically coupled to each other. When the gas generator 32 generates a high pressure gas to extrude the rotary elements 36, the wound tension member 40 is wound out to rotate the pulley 144c in the direction indicated by an arrow A in FIG. 28. As shown in FIG. 28, therefore, the shearing pins 26ca are sheared to delay rotation of the pulley 144c due to its inertia. A phase difference occurs between the pulley 144c and the plate 144b, and the cam surface of the pulley 144c causes the multiple projections (fingers) 144bb to be deformed toward the axis. Furthermore, as shown in FIG. 29, the pulley 144c rotates relative to the plate 144b to mesh the plural fingers of the plate 144b with the multiple knurls on the sleeve 44a, resulting in the clutch coupling to rotate the retractor shaft 24, as shown in FIG. 29. The speed-increasing mechanism including the pulley 144c, the tension member 40, and the rotary elements 36 accelerates as well as rotates, causing the retractor shaft 24 to rotate in the webbing-winding direction (the direction indicated by an arrow A in FIG. 30), allowing the reel 22 to take up the webbing.

When the webbing has been wound up in the aforementioned way and thereafter the webbing is wound out because the occupants move in the event of a collision, the take-up reel 22 is rotated in the webbing winding-out direction. This rotation is transmitted to the retractor shaft 24 via the sleeve 44a, and the shaft 24 is in turn rotated in the webbing winding-out direction. Now, since the emergency lock mechanism prevents the right portion of the shaft 24, as viewed in FIG. 25, from rotating in the webbing winding-out direction, the torsion bar 24a is twisted and plastically deformed as described above.

As the retractor shaft 24 rotates in the webbing winding-out direction, the pulley 44c coupled to the retractor shaft 24 rotates in the reverse direction, winding up (winding around) the tension member 40 on the outer periphery of the pulley 44c. This allows the rotary elements 36 to be pushed back toward the initial position via the tension member 40.

Figure 31:
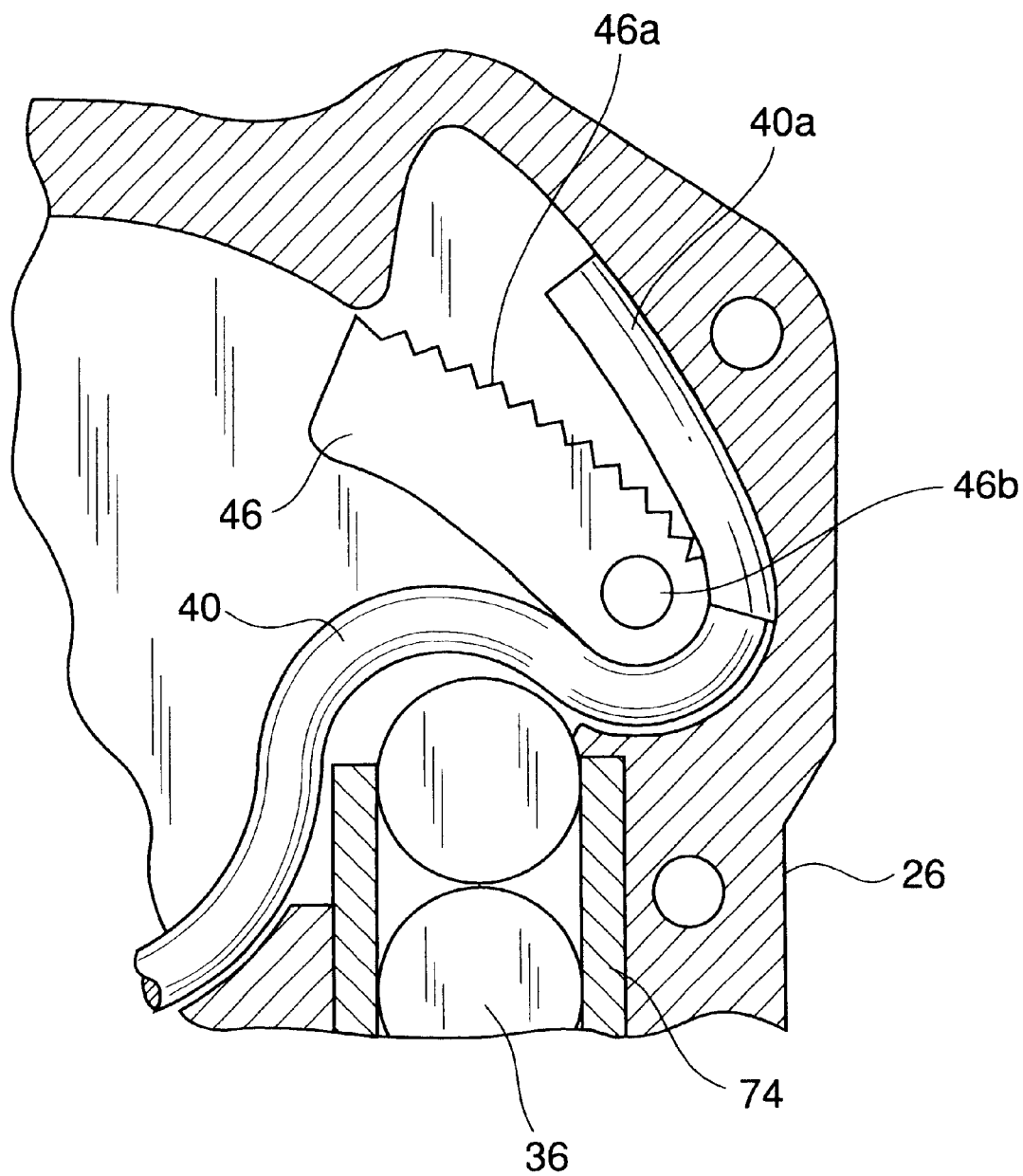
FIG. 31 is an explanatory diagram for explaining the operation of the cl amp.

In FIG. 31, if the rotary elements 36 are further pushed back exceeding the initial position of the rotary elements 36 shown in FIG. 22, any biasing force exerted on the clamp 46 by the rotary elements 36 is eliminated, so that the upper end of the clamp 46 can be swung, releasing the clamp 46. When the one end of the tension member 40 is disengaged from the clamp 46, nothing restrains rotation of the clutch mechanism 44 to permit any further rotation of the retractor shaft 24 coupled to the clutch mechanism 44.

Figure 32:
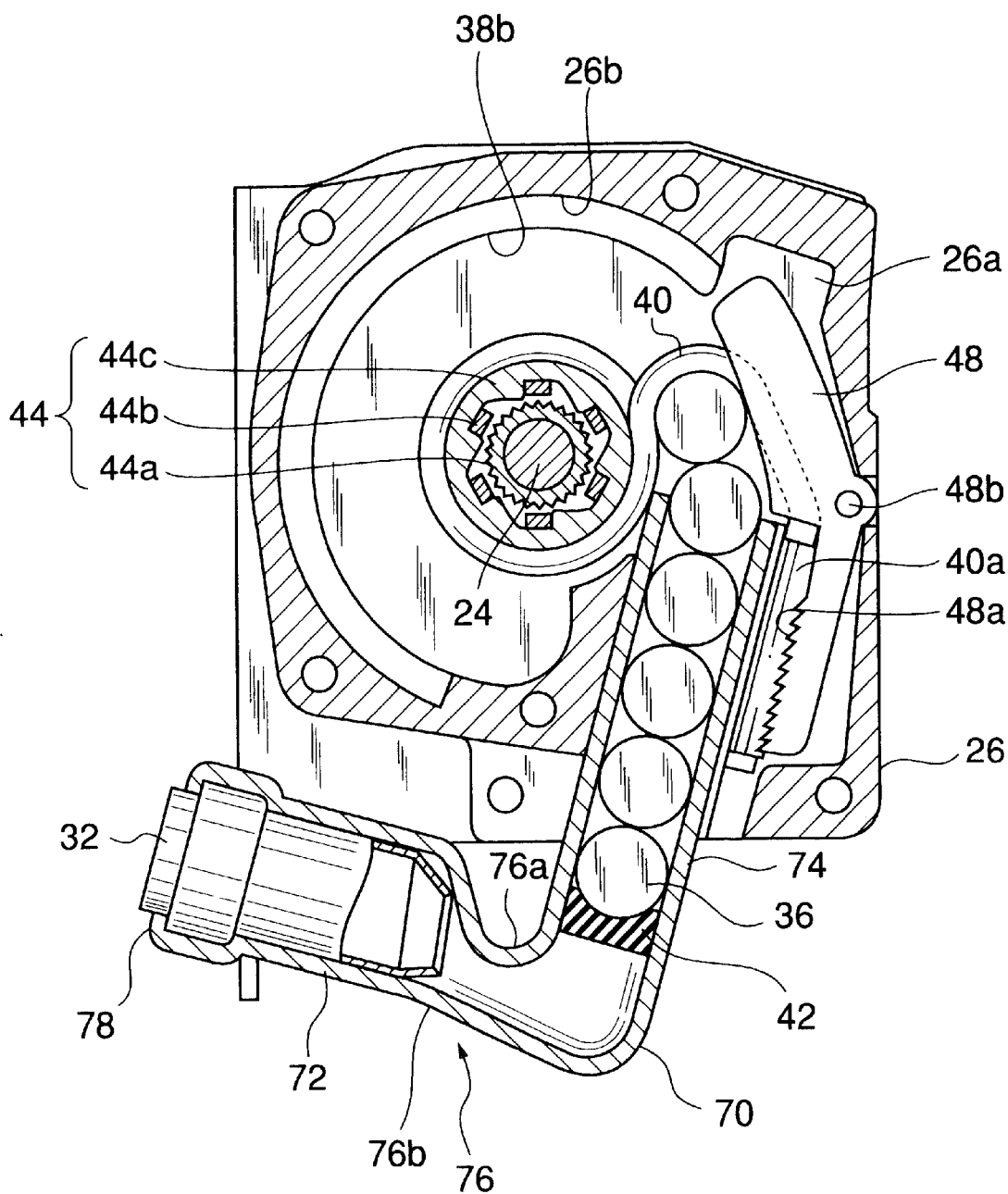
FIG. 32 is an explanatory diagram for explaining the sixth embodiment of the present invention utilizing the principle of leverage to clamp.
Figure 33:
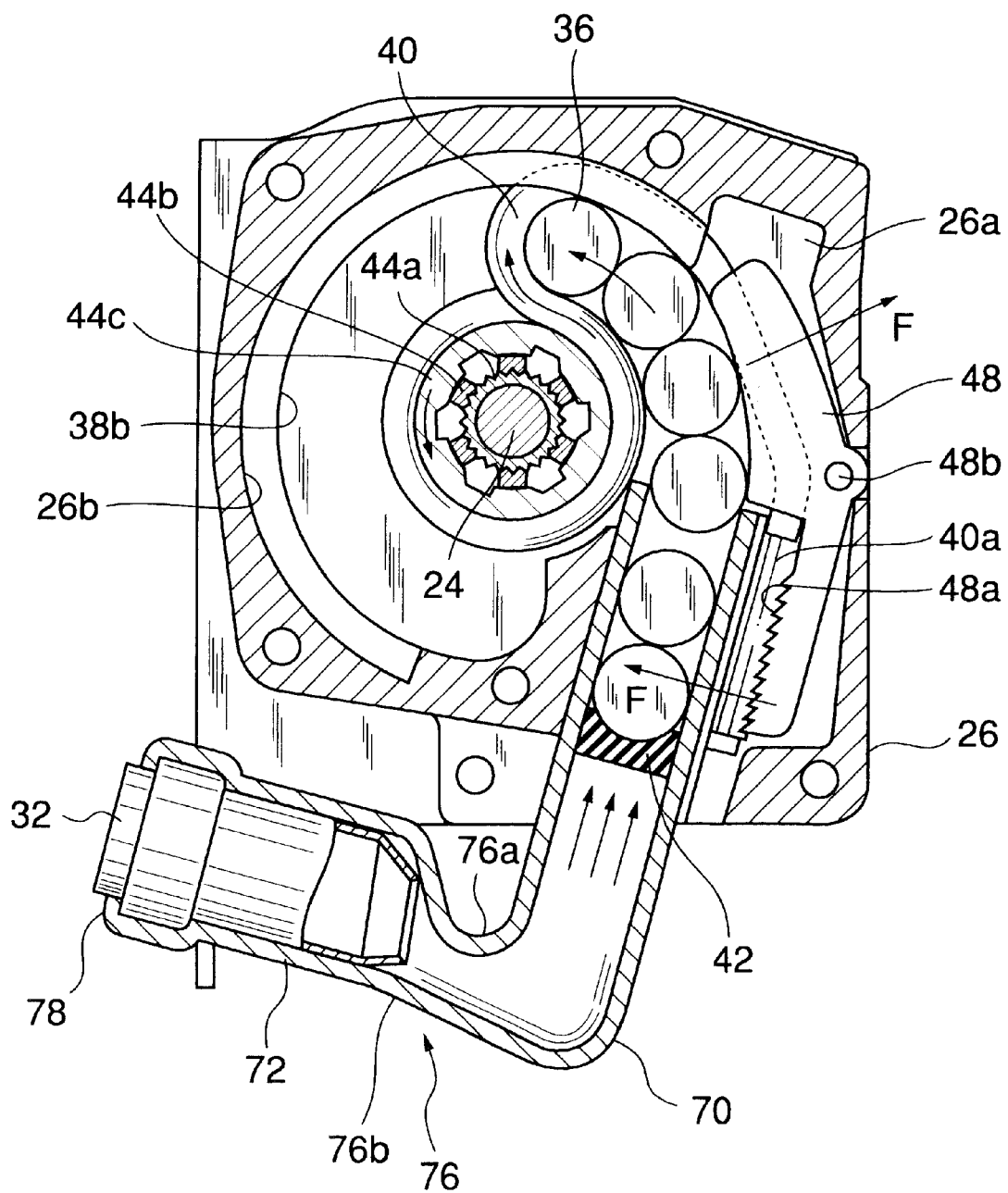
FIG. 33 is an explanatory diagram for explaining the operation of the clamp.
Figure 34:
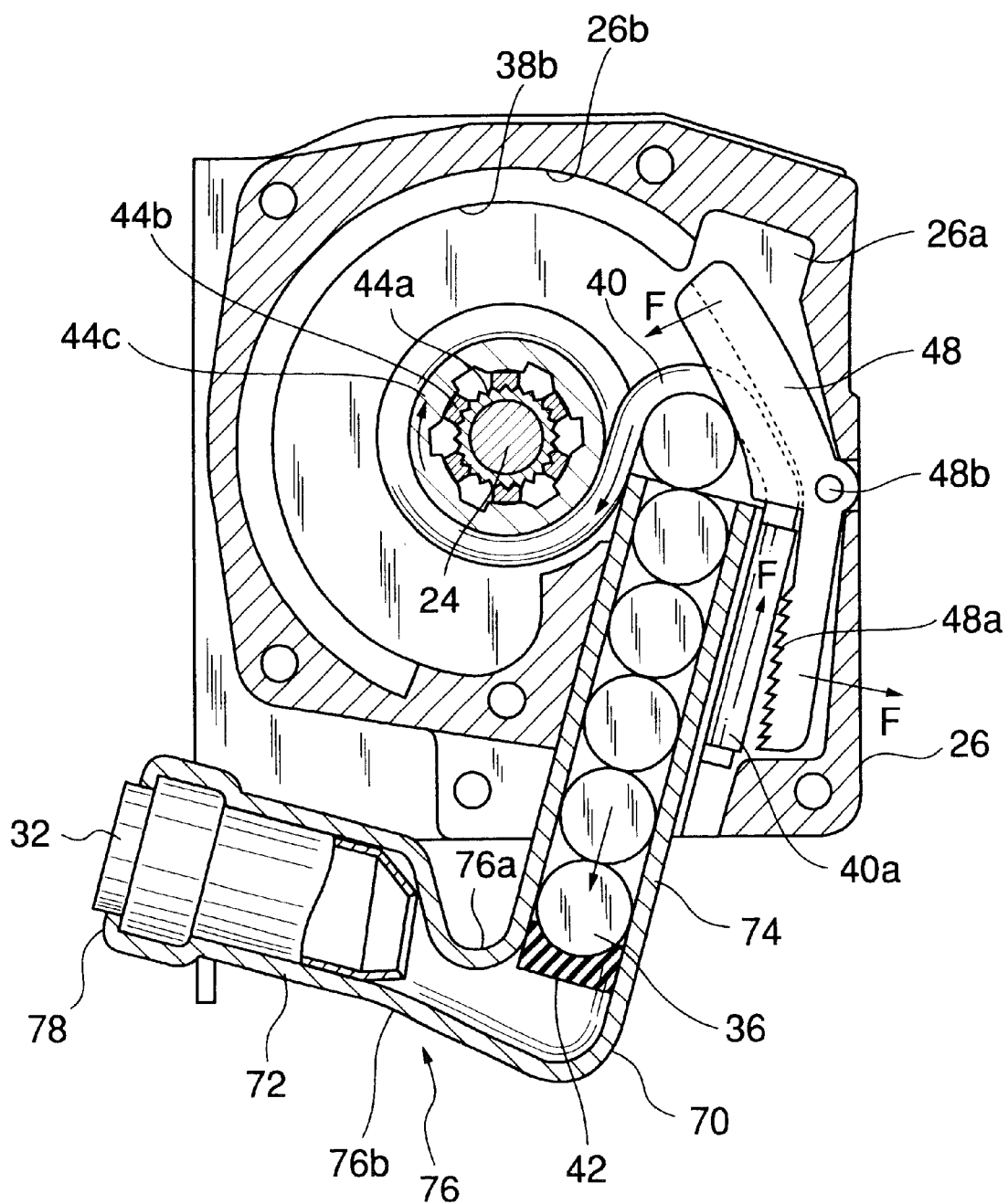
FIG. 34 is an explanatory diagram for explaining the operation of the clamp.

FIGS. 32 to 34 illustrate a sixth embodiment of the present invention in which the clamp is modified. This type of clamp utilizes the principle of leverage to release the clamp.

As seen in FIG. 32, the clamp 48 is V-shaped, having a central portion rotatably pivoted to the housing 26 by the axis 48b. In the initial state shown in FIG. 32 and in the operational state of the pretensioner shown in FIG. 33, a load F is applied to the upper portion of the clamp 48 by the rotary elements 36. The clamp 48 is to rotate clockwise about the axis 48b serving as fulcrum, so that lower teeth 48a of the clamp 48 is meshed with the tension member 40 via the cast coating 40a (see FIG. 33).

Further, as shown in FIG. 34, when the webbing is wound out and the rotary elements 36 are further pushed back exceeding the initial position, any biasing force exerted on the clamp 48 by the rotary elements 36 is eliminated, so that the clamp 48 is rotated in the direction (counterclockwise) where the retained tension member 40 is released. The tension member 40 is free from the clamp 48, and further permits rotation of the retractor shaft in the webbing winding-out direction.

Figure 35:
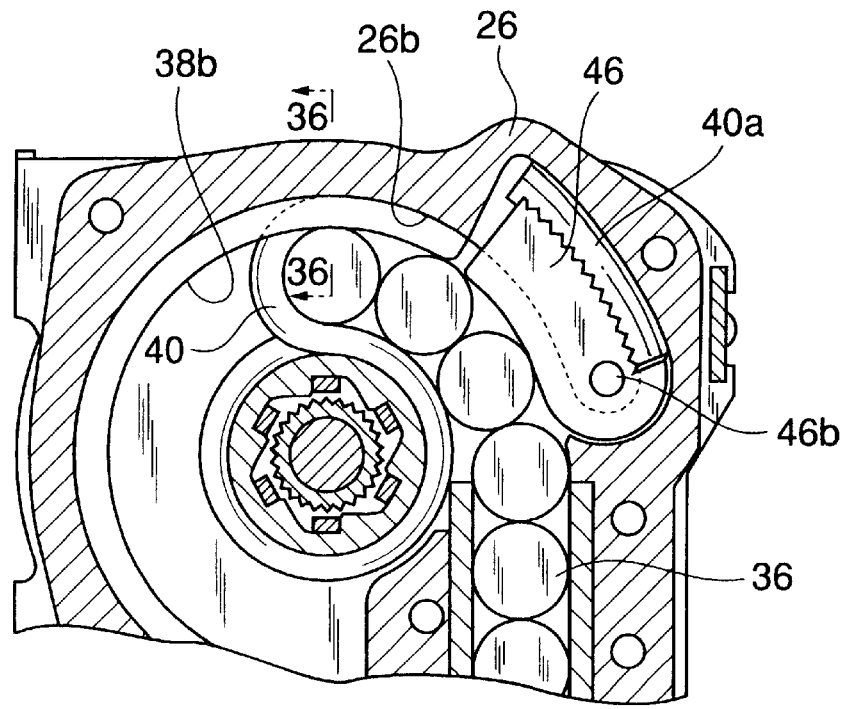
FIG. 35 is an explanatory diagram for explaining the seventh embodiment of the present invention in which the tension member is received in a groove.
Figure 36:
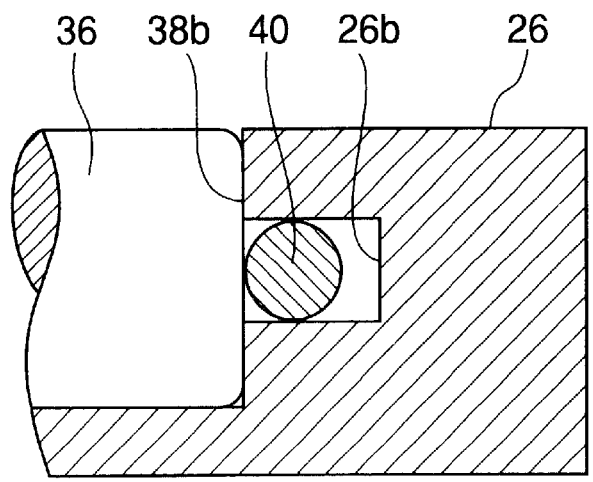
FIG. 36 is a sectional view, taken along a line 36—36 of FIG. 35, for explaining the same embodiment in which the tension member is received in the groove.

FIGS. 35 and 36 illustrate a seventh embodiment of the present invention in which the tension member 40 is less damaged. According to the present embodiment, a groove is formed along the moving element passage 38b to reduce damage caused by the rotary elements 36 pressing the tension member 40 in the radial direction. In other words, a circumferential groove 26b is formed in inner surface of the clamp 46 or in the inner periphery of the housing 26. The groove 26b receives the tension member 40, allowing the rotary elements 36 to be moved in direct contact with the moving element passage 38b. This avoids the tension member 40 from being sandwiched between the rotary elements 36 and the moving element passage 38b.

Also in the embodiment named in the above with reference to FIGS. 32 to 34, the groove 26b is formed in the moving element passage 38b of the housing 26 and in the inner surface of the clamp 48. This leads to reduction in damage caused by sandwiching the tension member 40.

The groove 26b is coated with resin, rubber, gel, etc., if appropriate, to thereby reduce further damage to the tension member.

Figure 37:
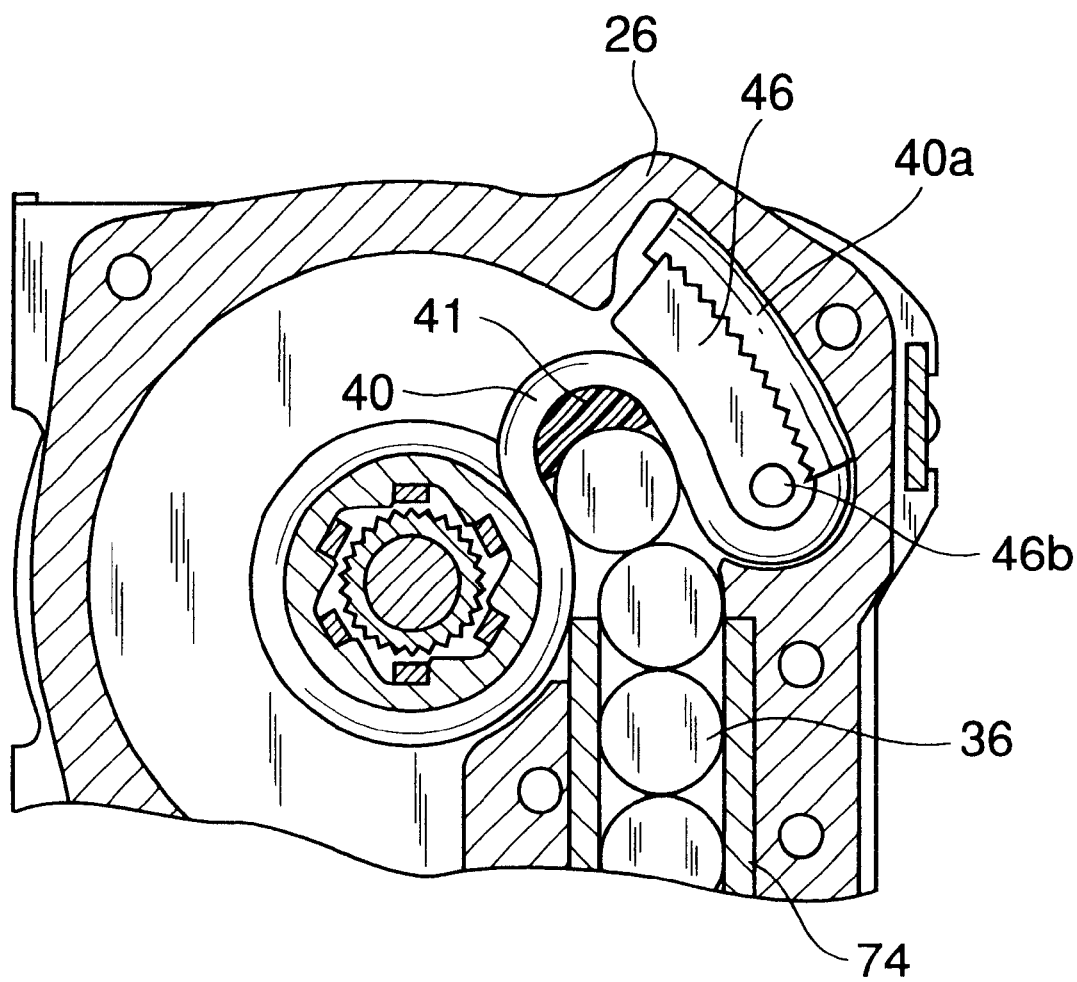
FIG. 37 is an explanatory diagram for explaining the eighth embodiment of the present invention in which a shock-absorbing member is provided between the tension member and the rotary element (moving element)

FIG. 37 illustrates an eighth embodiment of the present invention in which the tension member 40 is less damaged by the rotary elements 36. According to the present embodiment, a shock-absorbing member 41 is disposed between the top rotary element 36 and the tension member 40. The shock-absorbing member 41 is adapted to absorb any shock or impact affected on the tension member 40 by the rotary elements 36 pushed due to the abrupt gas expansion caused by powder ignition. The shock-absorbing member 41 is formed of resin, rubber, etc.

Figure 38:
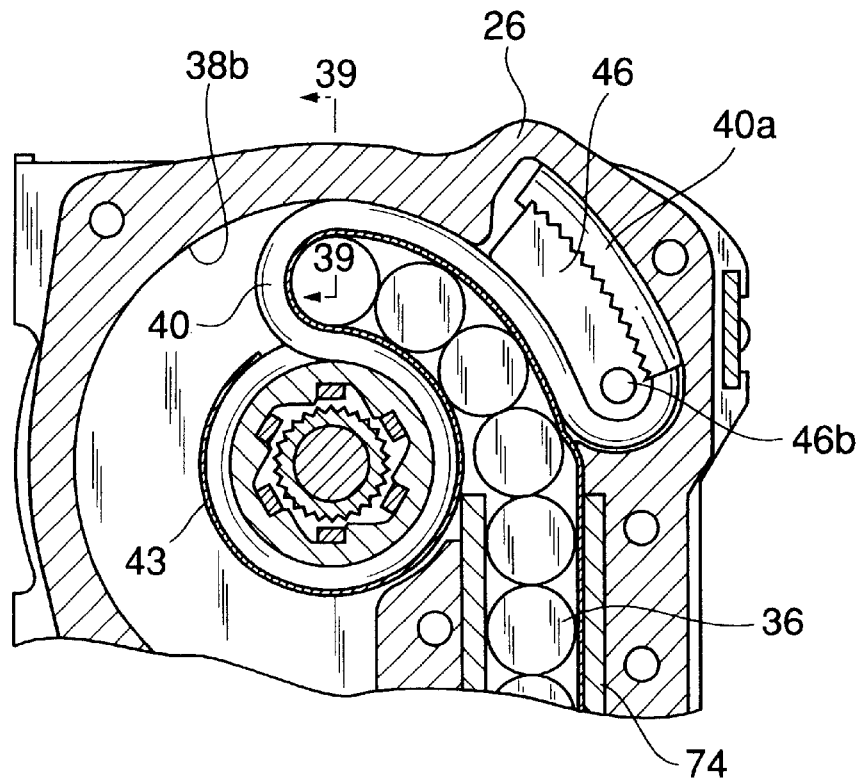
FIG. 38 is an explanatory diagram for explaining the ninth embodiment of the present invention in which an intermediate member for facilitating to smoothly move the rotary elements along the rotary element passage.
Figure 39:
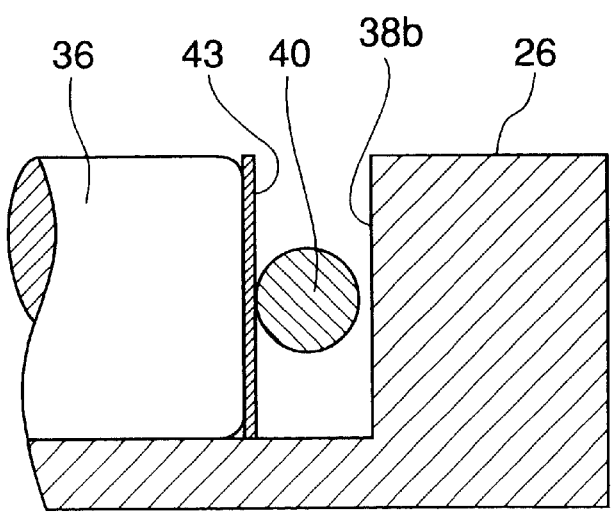
FIG. 39 is a sectional view taken along a line 39—39 of FIG. 38.

FIGS. 38 and 39 illustrate a ninth embodiment of the present invention in which rotational movement of the rotary elements 36 is made stable. According to the present embodiment, an intermediate member 43 is disposed between the rotary elements 36 an d the tension member 40. The intermediate member 43 is made of a band-like thin film with which the outer peripheries of the rotary elements are contacted, and is arranged along the interior of the pipe 74 and along the tension member 40. This arrangement allows the rotary elements to smoothly move in the rotational direction. The intermediate member 43 is formed of a flexible material capable of absorbing shock such as a stainless plate, a steel plate or high intensity resin.

Now, another modification of the pushing member will be described.

Figure 40:
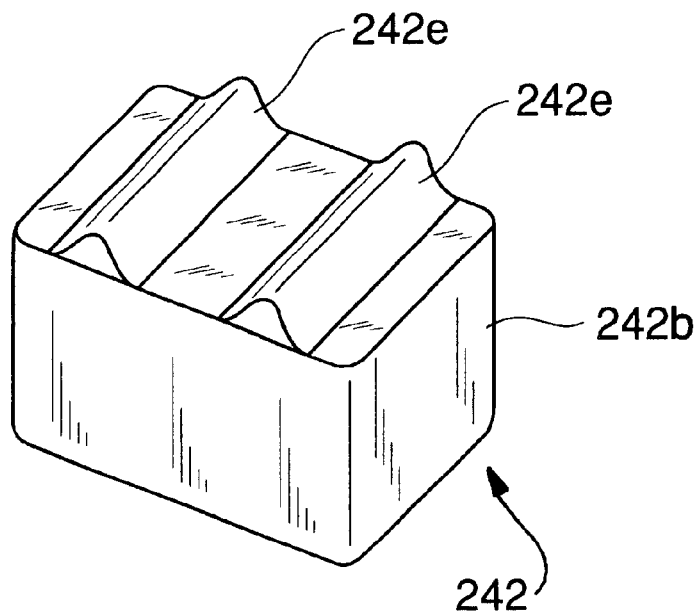
FIG. 40 is a perspective view for explaining the tenth embodiment of the present invention in which an pushing member adapted to reduce a rattle of the rotary elements.

According to a tenth embodiment of the present invention illustrated in FIG. 40, the pushing member 242 includes two elastic portions 242e on the upper surface (the rotary element side) of the seal member 242b shaped into a prism. Each elastic portion 242e is made of elastic material such as rubber, plastic or resin, and comprises two strips of projections in parallel to each other so as to receive one circular rotary element 36. The elastic portions 242e suppress movement of the rotary elements 36 in the vehicle-advancing direction due to vibration of the vehicle and prevents sound generation.

Figure 41:
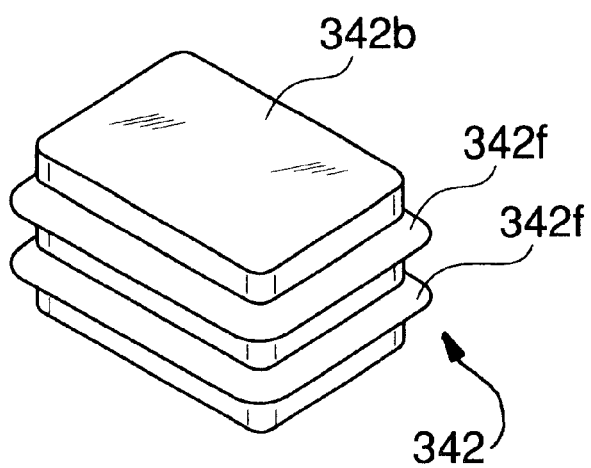
FIG. 41 is a perspective view for explaining the eleventh embodiment of the present invention in which the pushing member is formed with a plurality of projections surrounding it periphery, thereby improving sealing effects.
Figure 42:
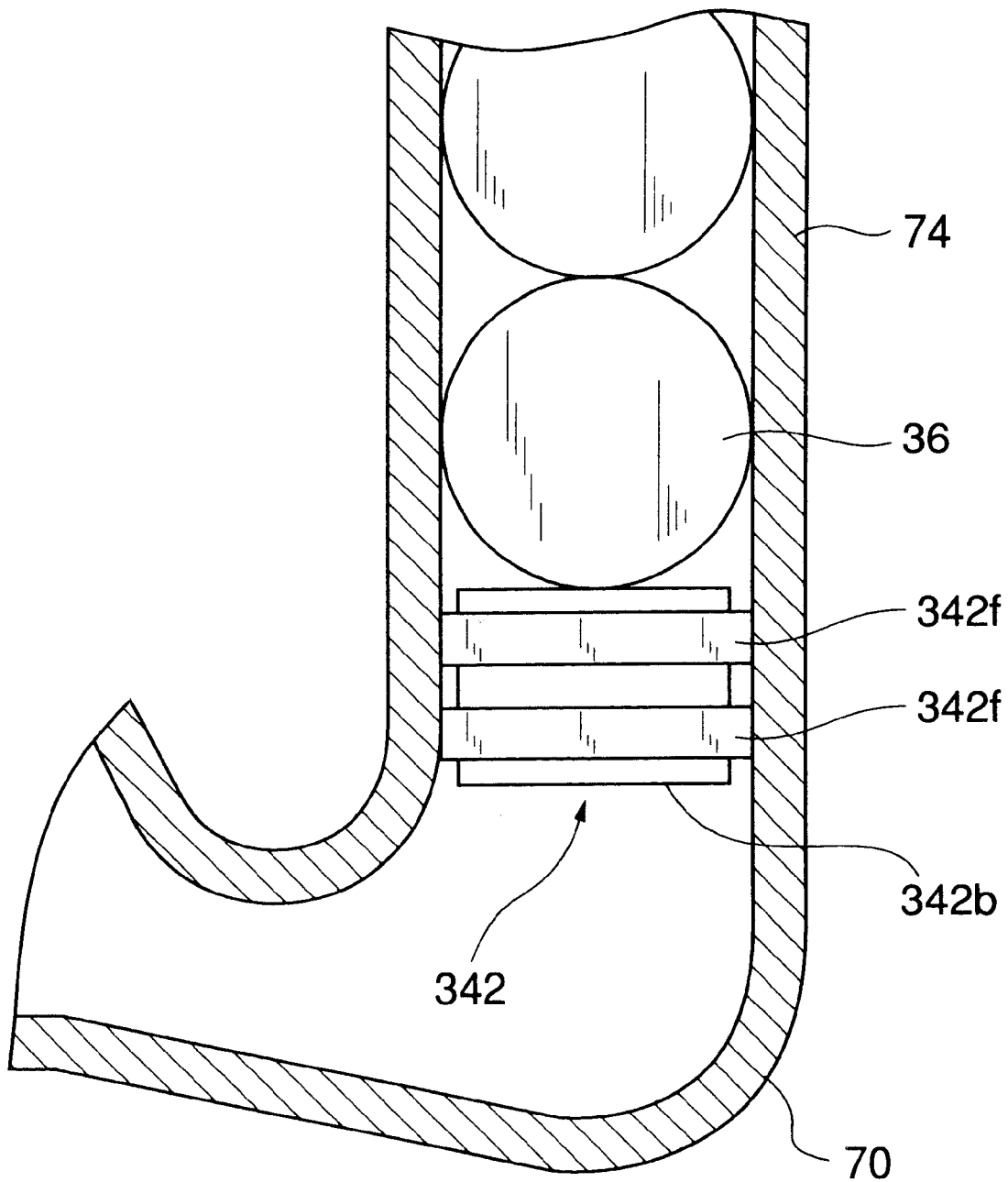
FIG. 42 is an explanatory diagram for explaining the sealing effects owing to deformation of the projections.

According to an eleventh embodiment of the present invention illustrated in FIGS. 41 and 42, a plurality of annular projections 342f are formed along the outer periphery of the pushing member 342, the outer periphery being tightened against the inner surface (cylinder section) of the pipe 74. If this pushing member 242 is introduced into the cylinder of the pipe 74, the annular projections 342f are collapsed and deformed to enhance tightness between the pushing member 342 and the cylinder.

Figure 43:
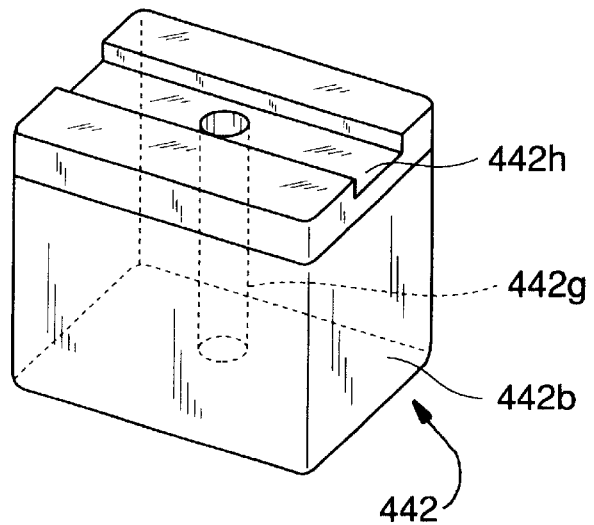
FIG. 43 is a perspective view for explaining the twelfth embodiment of the present invention in which the pushing member defines a degassing hole to escape a remaining gas pressure contained in the pipe, thereby facilitating to return the rotary elements.
Figure 44:
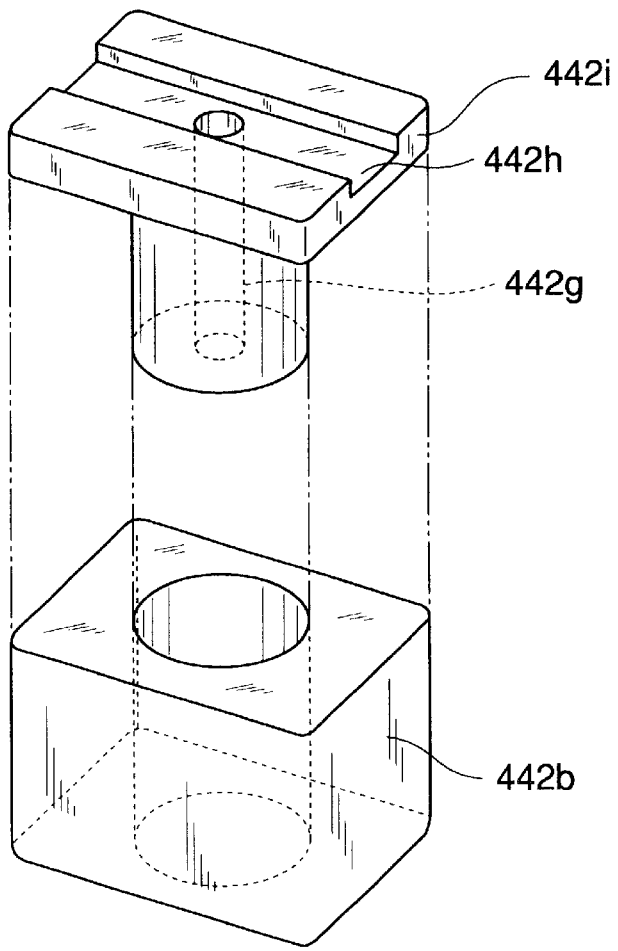
FIG. 44 is a perspective view for explaining an assembling example of the pushing member having the degassing hole.
Figure 45:
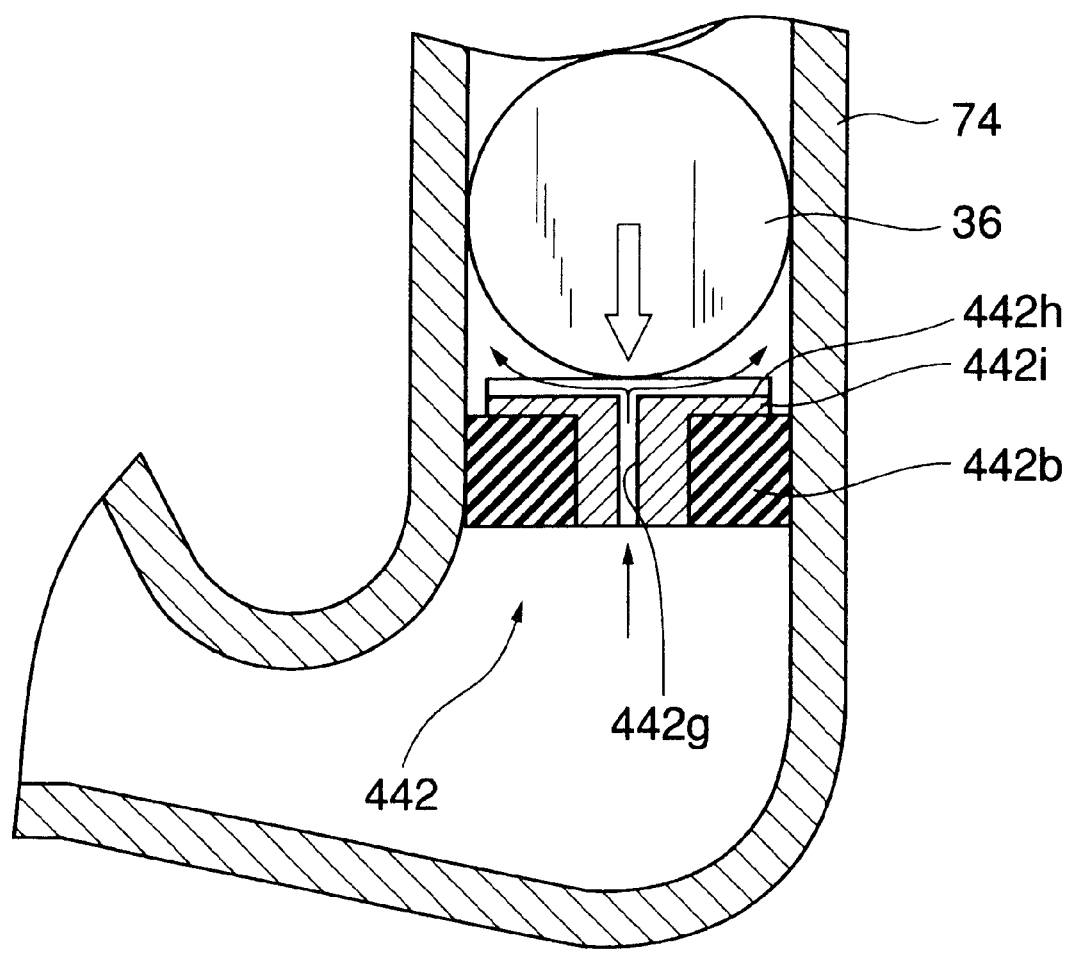
FIG. 45 is a diagram for explaining the function of the minute tube.

According to a twelfth embodiment of the present invention illustrated in FIGS. 43 to 45, the pushing member 442 includes a degassing hole. Referring to FIG. 43, the pushing member 442 has a through-hole (minute tube) 442g defined between the upper surface and the lower surface. A slit 442h is formed in the upper surface between one rotary element 36 and the opening of the through-hole 442g to define a clearance for escaping remaining gas.

FIG. 44 is a perspective view for explaining by way of example the pushing member 42 having such a minute tube. According to the present embodiment, the pushing member 442 includes a seal member 442b and an upper member 442i. The seal member 442b includes a tubular space (through-hole) in the longitudinal direction at the center thereof. The upper member 442i includes the slit 442h in the upper surface, having a T-shaped member in longitudinal section with a tubular projection formed in the lower surface center. The through-hole (minute tube) 442g extends beyond the center of the slit 442h to the lower surface of the projection. The upper member 442i is made of metal or plastic (resin) resistant to heat, for example. The seal member 442b is also made of elastic material resistant to heat. The tubular projection is engagingly inserted into the through-hole of the seal member 442b to assemble the minute-tube-equipped extruding member 442.

FIG. 45 is a diagram for explaining the function of the minute tube 442g. As described above, in the case where the retractor shaft 24 is twisted and the webbing can be wound out, the rotary elements 36 move back into the cylinder. If the extruding member 442 is to move back toward the initial position, a remaining pressure of combustion gas within the expansion chamber 30 prevents the returning of the pushing member 442. Therefore, the remaining gas is emitted to the cylinder side from the degassing slit 442h via the minute tube 442g of the extruding member 442 to smoothly return the rotary elements 36 and the pushing member 442.

Figure 46:
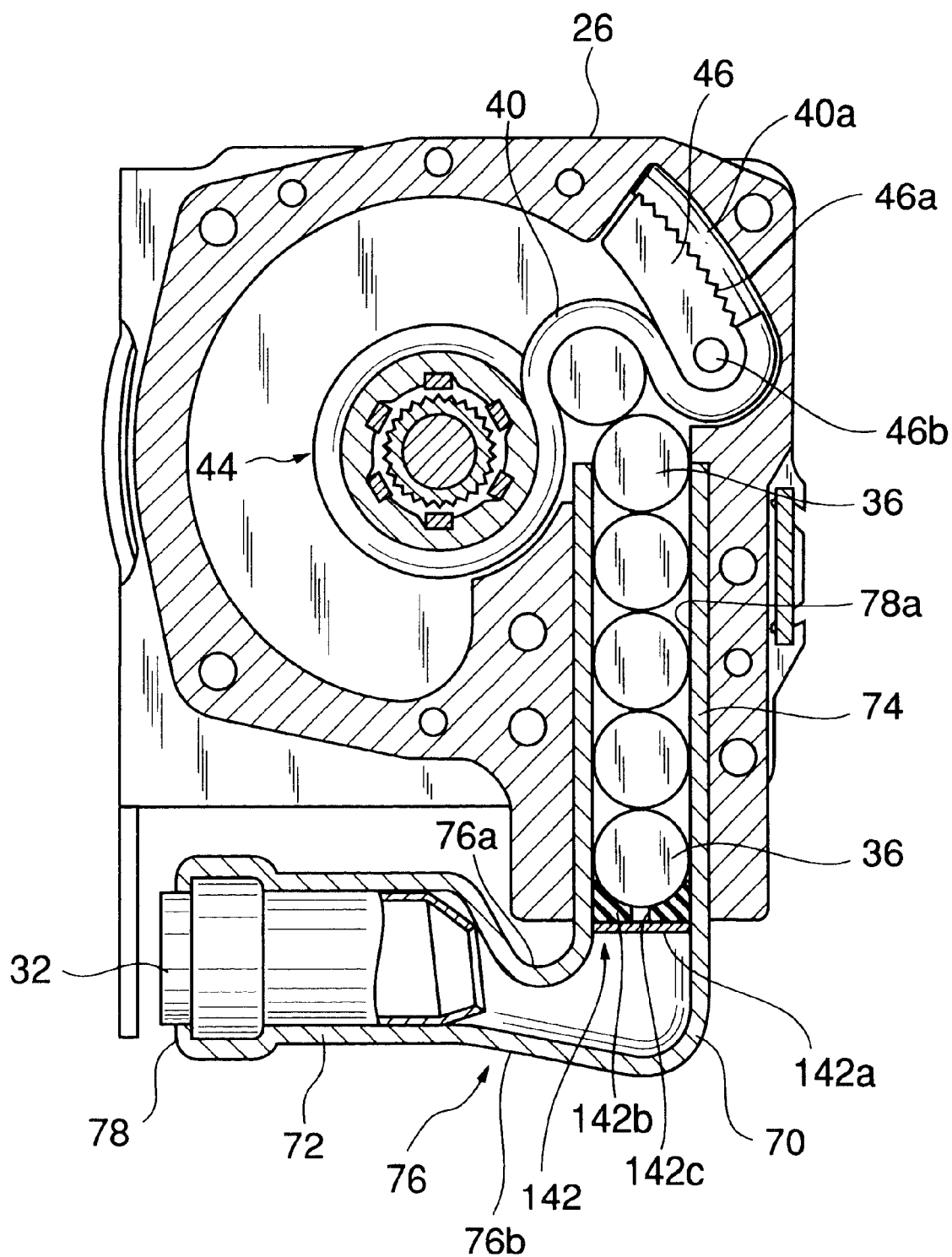
FIG. 46 is an explanatory diagram for explaining the thirteenth embodiment of the present invention in which the pipe is combined with the seal member outwardly flared due to a gas pressure.

FIG. 46 is a sectional view for explaining a thirteenth embodiment of the present invention in which the pretensioner using a pipe shown in FIG. 22 is combined with the pushing member 142 shown in FIG. 10.

According to the present embodiment, a straight path for the rotary elements 36 is formed of the pipe 74, including a cylinder using the pushing member 142 as a piston. As described in the above with reference to FIGS. 10 and 11, also in the present embodiment, the pushing member 142 is deformed by gas pressure, thus improving a sealing property against gas leakage within the straight path 38a through which the rotary elements 36 are moved.

Further, according to a fourteenth embodiment of the present invention illustrated in to FIGS. 47A and 47B, the pushing member within the pipe can be implemented using an pushing member 242 that includes a projection part (conical frustum) 242d having a taper in the center of the piston 242a as shown in FIGS. 12 and 13. In this case, the taper of the projection 242d also allows the seal member 242b to be forcibly flared outward from the center, improving a sealing property against gas leakage.

Incidentally, also in the fourth embodiment illustrated in FIGS. 14 to 16, a cast coating 40a serving to improve meshing of the clamp 46 can be formed on one end of the tension member 40.

Application of any other modification to the foregoing embodiments is within the scope of the invention.

The seat belt system equipped with a retractor including a pretensioner in accordance with a fifteenth embodiment of the present invention will now be described with reference to FIGS. 48 to 54.

Figure 48:
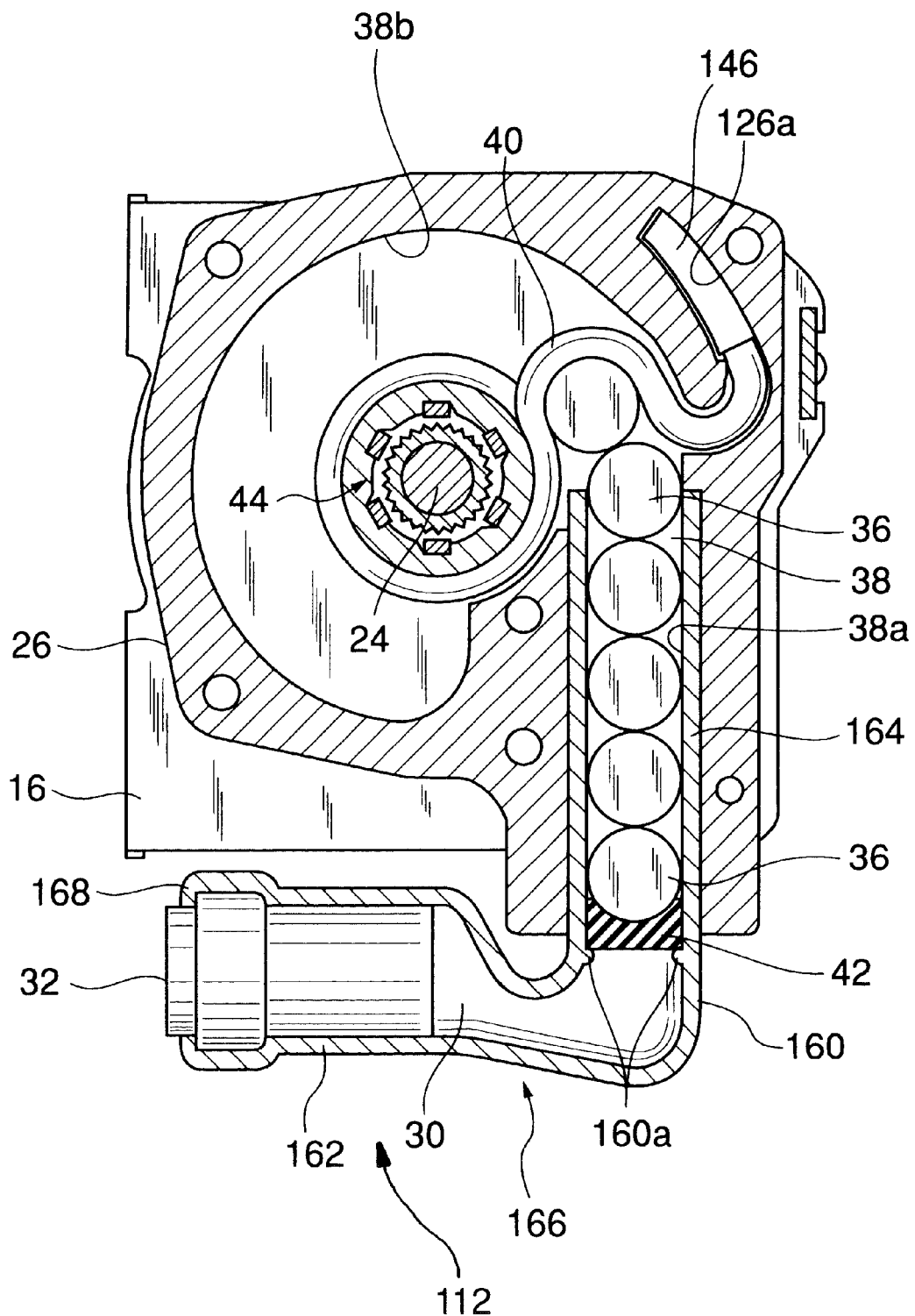
FIG. 48 is a sectional view for explaining the pretensioner in accordance with the fifteenth embodiment of the present invention.

According to the present embodiment, a plurality of cylindrical rotary elements 36 are introduced in a row within a moving element passage 38a in such a manner that the rotary elements 36 can be contacted with one another and are free to rotate. The top rotary element 36 is positioned between the inner wall surface of the housing 26 and the clutch mechanism 44, as shown in FIG. 48. The tension member 40 wound around on the clutch mechanism 44 is turned around halfway on the side surface of the top rotary element 36, passing through between the rotary element 36 and the inner wall surface of the housing 26, introducing a retention member 146 at one end of the tension member 40 into retention member accommodation space 126*a* in the housing 26, which is then retained therein.

According to the present embodiment, the bottom of the pipe 164 is communicated to a laterally extending pipe 162 below the retractor shaft 24 via the constriction part 166. The pipe 162 and the pipe 164 integrally form an L-shaped pipe 160.

The pipe 162 serves as a pressure chamber 30. A pressure-applying device 32 is inserted into an opening of the pipe 162, and the pressure-applying device 32 is mounted to the pipe 162 by caulking the pipe end 168.

Figure 49:
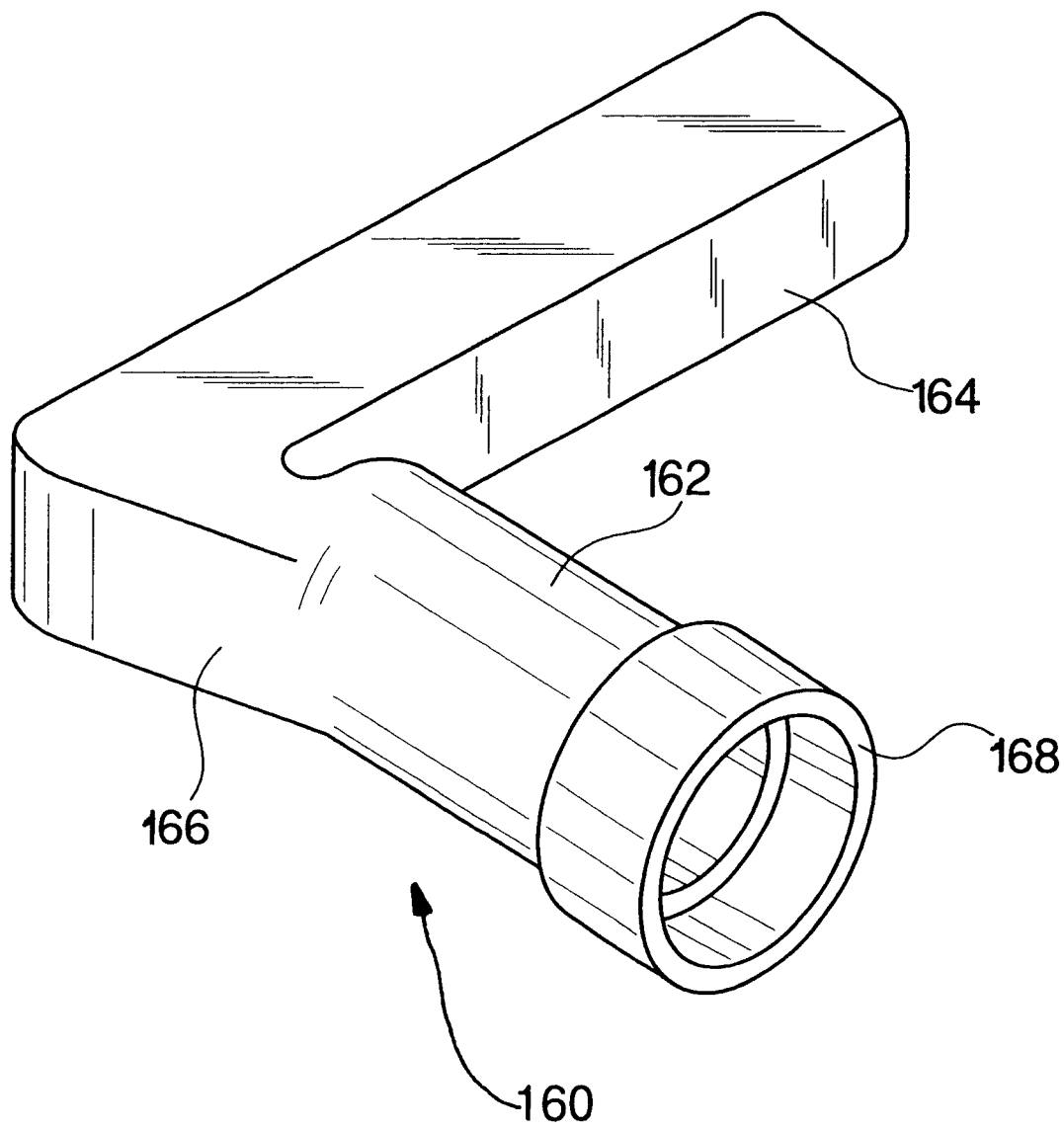
FIG. 49 is a perspective view for explaining the pipe.
Figure 50:
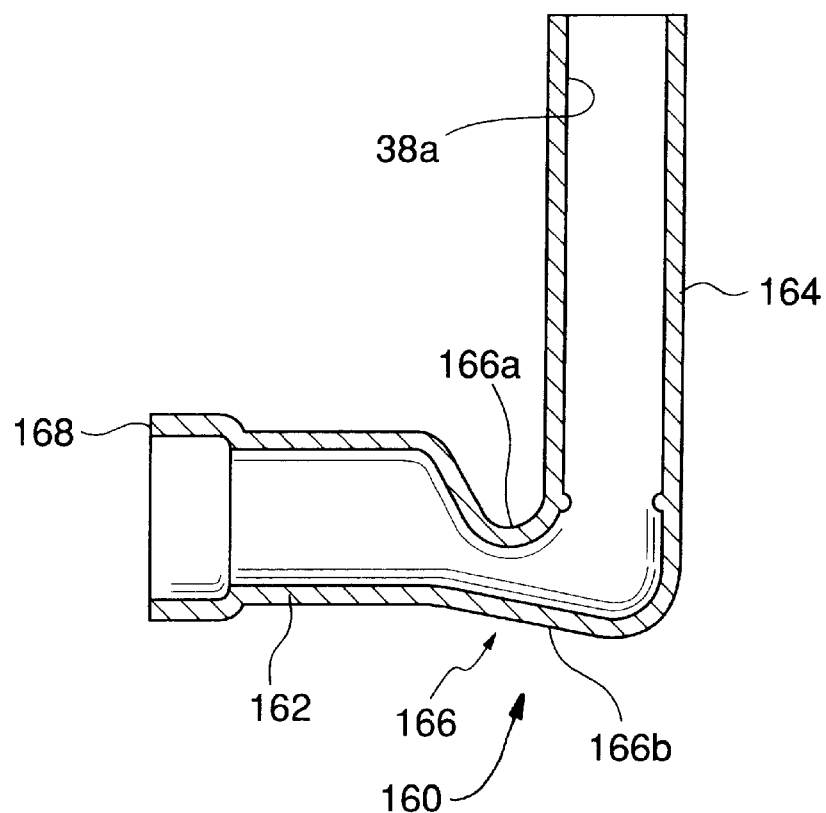
FIG. 50 is a sectional view for explaining the pipe.

As seen in FIGS. 49 and 50, of the L-shaped pipe 160, a portion of the pipe 162 to which the pressure-applying device 32 is mounted is shaped into a circle in section, and a cylinder portion of the pipe 164 is rectangular in section. Each rotary element 36 uses a cylindrical roller having a diameter sufficiently larger than a thickness (height), for example.

Figure 51:
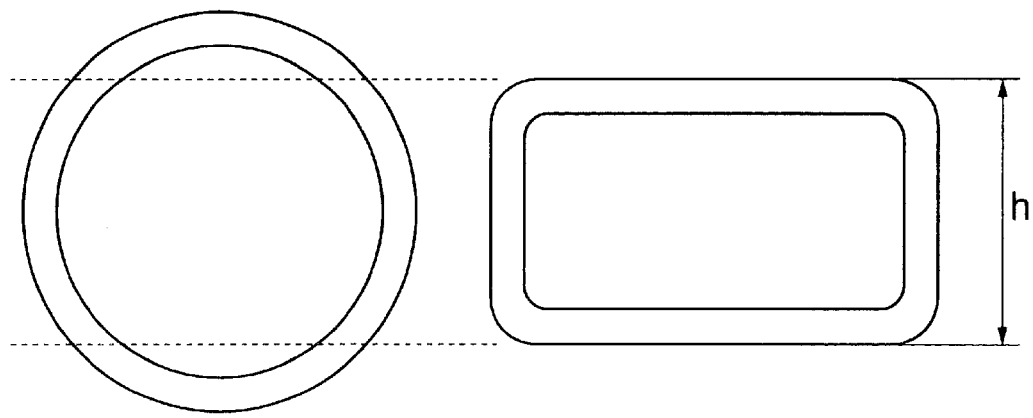
FIG. 51 is an explanatory diagram for explaining a dimensional difference between a cylindrical pipe as used herein and a square column pipe as used herein.

As shown in FIG. 51, the cylinder portion may be rectangular in section rather than circular in section, so that dimension "h" extending widthwise of the retractor 13 (in the axial direction of the retractor shaft 24) can be smaller under the condition where the same gas pressure density is applied to the piston (extruding member 42), contributing to downsizing of the retractor 13.

As shown in FIG. 52A, the L-shaped pipe 160 includes the constriction part 166, with the upper constriction 166*a* positioned lower so that the cylinder length L may be set L>l where "l" denotes the cylinder length in the case where the constriction part 166 is not present (see FIG. 52B). This can endure longer stroke length of the cylinder part. Therefore, the pushing member 42 can maintain the pressure in a longer distance, resulting in increased moving distance of the moving elements.

The central axis X1 of the pipe 162 is positioned higher than the center X2 of the inner diameter of the constriction part 166 through the lower constriction 166*b* of the constriction part 166, so that the center position wherein the gas generator 32 is mounted can be located higher by Δh. Therefore, the gas generator 32 can be more closely positioned to the retractor shaft 24, contributing to downsizing of the overall system.

FIG. 53 illustrates a sixteenth embodiment of the present invention in which the pipe is modified. According to the present embodiment, as is similar to the pipe modification in FIG. 50, the section of the pipe 262 is circular and the section of the pipe 264 is rectangular. However, the pipe 264 is curved rather than straight, as is different from the pipe (cylinder) 164 in FIG. 50. Even within such a curved or arcuate cylinder, the rotary elements 36 can also be pushed into the circumferential path 38*b* for the moving elements. Therefore, the same operational effects as the pretensioner shown in FIG. 48 can be anticipated.

Figure 54:
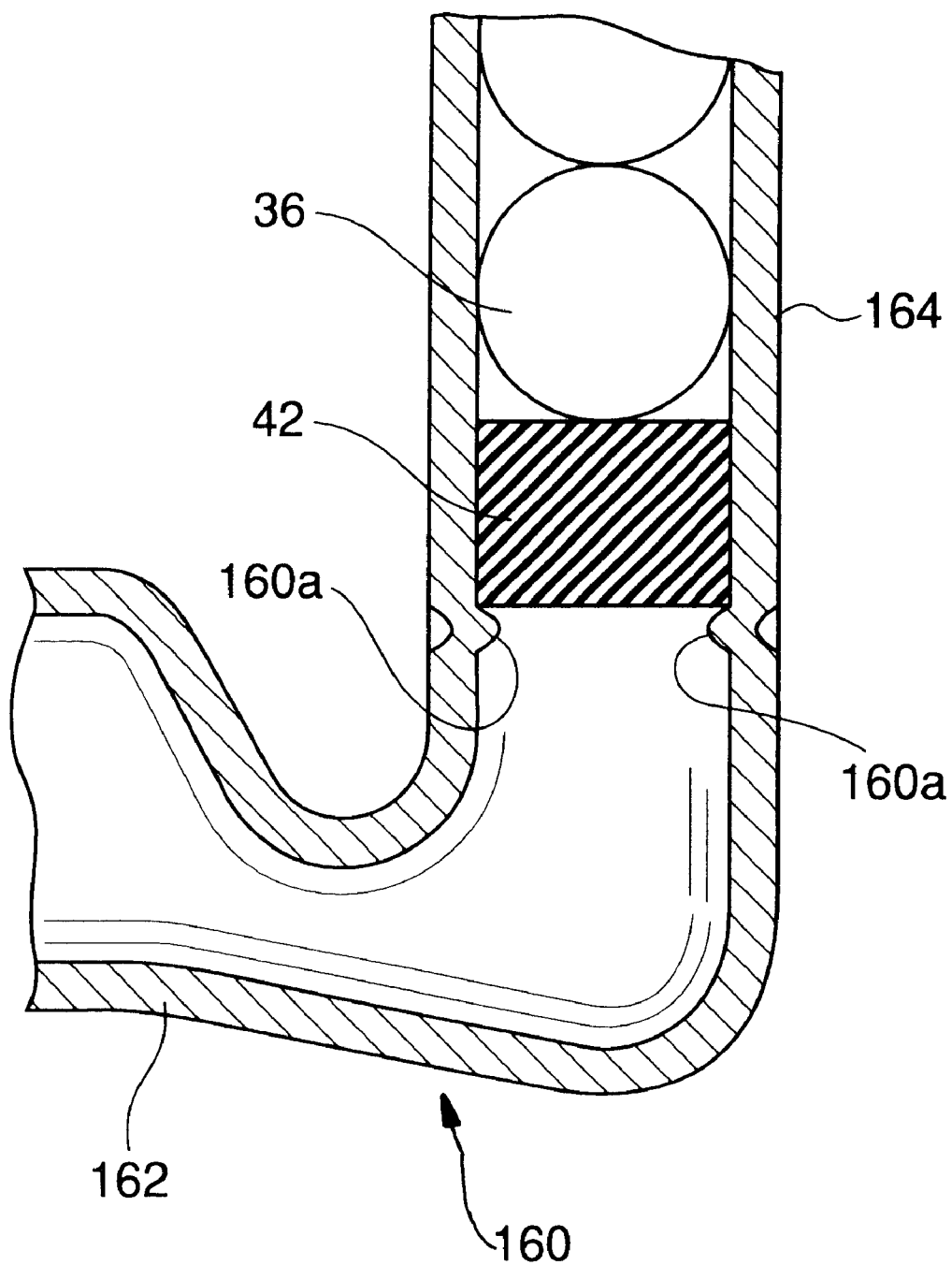
FIG. 54 is an explanatory diagram for explaining a projection part for retaining the pushing member within the pipe.

FIG. 54 shows by way of example a projection part 160*a* serving as a positioning part for determining the initial position of the pushing member 42. The projection part 160*a* is formed on the inner wall of the pipe 164, including one or more projections 160*a* or a projection extending along the inner wall. The projection part 160*a* is produced, for example, by extruding machining or hitting the side surface of the pipe 164. The projection part 160*a* can also be produced by using screws, rivets or by welding a projection piece(s), etc. The pushing member 42 is fitted to the upper portion of the projection part 160*a* to position the pushing member 42 and to prevent the rotary elements 36 from dropping. The pushing member 42 is tightened against the inner wall of the pipe 160 due to its own resiliency or elasticity, and the projection part 160*a* may not be employed.

Figure 55:
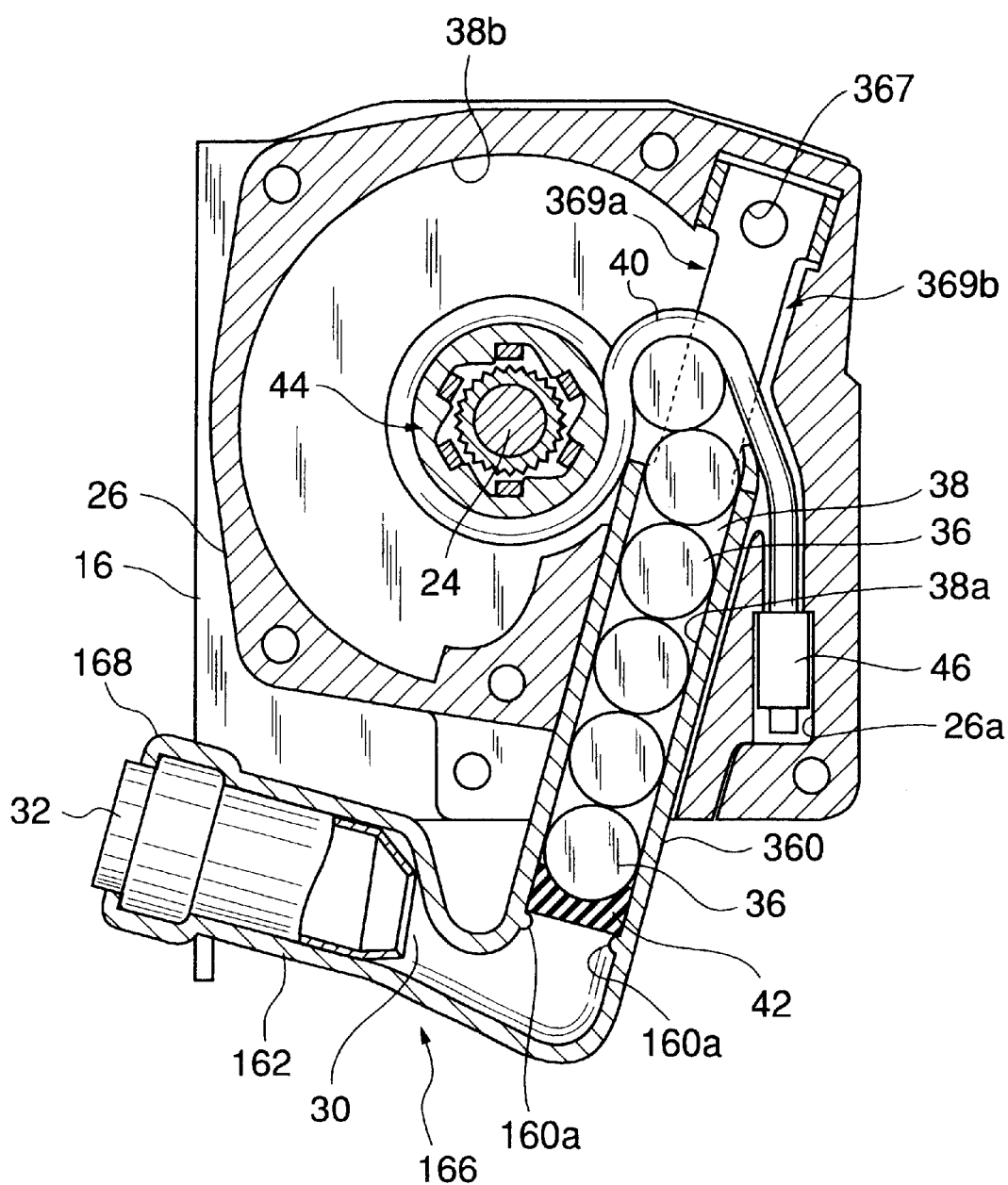
FIG. 55 is a sectional view for explaining the pretensioner in accordance with the seventeenth embodiment of the present invention.
Figure 56:
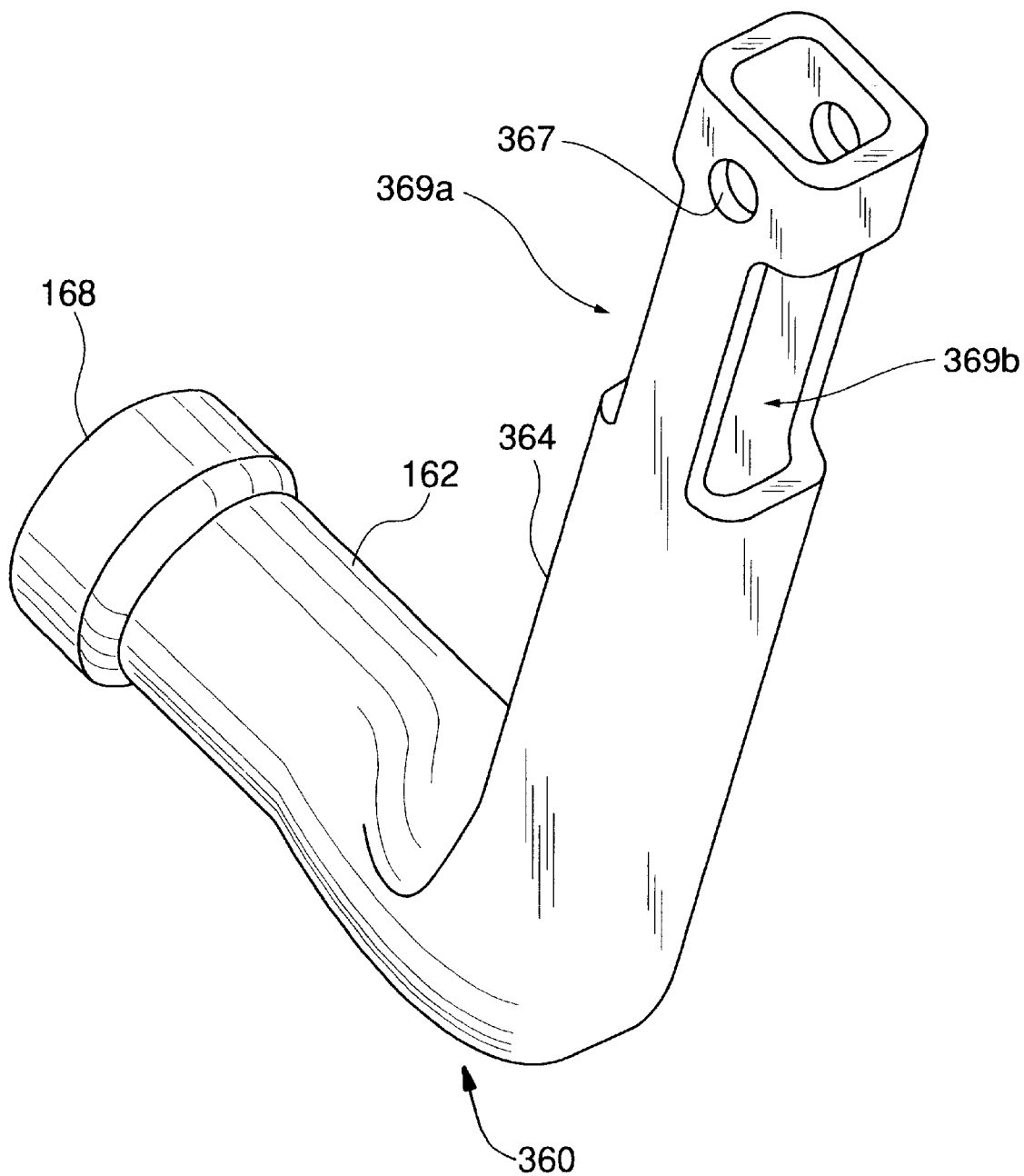
FIG. 56 is a perspective view for explaining the same embodiment in which a pipe having opening portions in its side surfaces, and bolt holes in its tip surfaces.

FIGS. 55 and 56 illustrate a seventeenth embodiment of the present invention.

In the pretensioner shown in FIG. 55, the L-shaped pipe 360 is obliquely assembled with the housing 26. A screw hole 367 is formed in the tip end of the pipe 360, through which the pipe 360 can be mounted to the housing by using a mounting bolt, etc. The pipe 360 includes opening portions 369*a* and 369*b* which are formed in the upper surface sides of the pipe 364 rectangular in section (see FIG. 56). of these opening portions, the opening portion 369*a* at the retractor shaft 24 side serves as an inlet/outlet of the rotary elements. The top rotary element 36 of the plural rotary elements 36 arranged within the rotary element path 38*a* defined by the pipe 364 is located in a substantially opening portion 369*a*, 369*b*. The tension member 40 wound around on the outer periphery of the clutch mechanism 44, passing through the opening portion 369*a*, is turned around halfway on the top rotary element 36, and is then introduced through the pipe 364 from the right opening portion 369*b* of the pipe 364 into the retention member accommodation space 26*a* formed in the housing 26 at the right to this pipe. The retention member 46 at the tip end of the tension member 40 is retained in the retention member accommodation space 26*a*.

According to the present embodiment, the pipe 360 required to hold the pressure is fixed to the housing 26 by using bolts, etc. The L-shaped pipe to which a high pressure is applied can be more positively fix thereto.

The pretensioner according to the aforementioned fifth to seventeenth embodiments employs a unique structure that has not been known in the art in which a moving element (either the row of the moving elements 36 or the single moving element) is combined with a speed-increasing mechanism using the principle of "running block" including the tension member 40, the moving element passage 38*b* and the clutch mechanism 44 smaller in diameter than that of the reel 22. Therefore, a shorter stroke of the cylinder 38*a* is required to accommodate the moving element(s), which corresponds to the moving amount of the moving elements 36. Further, since the cylinder is rectangular in section, the dimension of the cylinder extending in the axial direction of the retractor shaft can also be reduced. As a result, the length and depth of the cylinder are relatively smaller in dimension, and the entire pretensioner can be downsized to reduce a vehicle-loading condition. Furthermore, since the cylinder is formed of a pipe and a sealing property of the pushing member is excellent, the machining process of the moving element passage can be simplified with low production costs.

Further, the gas generator 32 is inserted into the pipe circular in section, improving a gas-sealing property. The pipe part into which the gas generator 22 is inserted is circular in section, thereby facilitating to caulk and fix the gas generator 32.

Still further, it is so constructed that the rotary elements can be entered or taken out from the side surface 369*a* of the pipe 360, and therefore the pipe end can be used as a fixing (mounting) portion for the pipe. The mounting portion can include a collar etc. that is to be engaged with the bolt hole or housing.

It is to be understood to a person skilled in the art that any modification may be made to the constituent elements of the foregoing embodiments to attain the same operational effects or the constituent elements may be added or deleted, but such modification may be embraced within the scope of the appended claims of the present invention.

What is claimed is:

1. A seat belt system equipped with a retractor including a pretensioner comprising:

a retractor base;

a retractor shaft rotatably supported by said retractor base and biased in a webbing-winding direction;

a gas generator mounted to said retractor base;

a drive mechanism driven by said gas generator to wind in said retractor shaft in the webbing-winding direction; and a clutch mechanism connecting said drive mechanism to said retractor shaft, said clutch mechanism comprising:
  a pulley connected to said drive mechanism and coaxially aligned with said retractor shaft, said pulley having a cam, and
  a plate rotatable relative to said pulley in a direction of rotation of said retractor shaft, said plate having integrally engaging fingers deformable to engage with said retractor shaft through the cam as said plate rotates relative to said pulley.

2. A seat belt system as claimed in claim 1, wherein said pulley includes a substantially cylindrical member inwardly defining the cam, and said plate includes a substantially disc-shaped base portion and the engaging fingers extend longitudinally of said retractor shaft beyond the base portion to engage with the cam.

3. A seat belt system as claimed in claim 2, wherein portions of the base portion from which the engaging fingers extend comprise deformable portions for facilitating deformation of the engaging fingers.

4. A seat belt system as claimed in claim 3, wherein said plate is formed of a plate-shaped member and the deformable portions have holes formed therein.

5. A seat belt system as claimed in claim 1, wherein said retractor shaft is knurled over an area that faces said plate.

6. A seat belt system as claimed in claim 1, further comprising a shearing pin for holding said pulley at a predetermined position relative to said retractor base.

7. A seat belt system as claimed in claim 1, wherein said drive mechanism comprises:
  a tension member having one end mounted on said retractor base and the other end wound around on the outer periphery of said pulley; and
  a moving element driven by a gas pressure generated by said gas generator to press a portion between the both ends of said tension member.

8. A seat belt system equipped with a retractor including a pretensioner comprising:
  a retractor base;
  a retractor shaft rotatably supported by said retractor base and biased in a webbing-winding direction;
  a gas generator mounted to said retractor base; a drive mechanism driven by said gas generator to wind in said retractor shaft in the webbing-winding direction; and
  a clutch mechanism connecting said drive mechanism to said retractor shaft, said clutch mechanism comprising
    a pulley connected to said drive mechanism and coaxially aligned with said retractor shaft, said pulley having a cam, and
    a plate rotatable relative to said pulley in a direction of rotation of said retractor shaft, said plate having integrally engaging fingers deformable to engage with said sleeve through the cam as said plate rotates relative to said pulley;
  wherein said retractor shaft is knurled over an area that faces said plate;
  wherein a sleeve is fixed to said retractor shaft, the sleeve being knurled over its outer periphery.

9. A seat belt system equipped with a retractor including a pretensioner, comprising:
  a retractor base;
  a retractor shaft rotatably supported by said retractor base and biased in a webbing-winding direction;
  a gas generator mounted to said retractor base;
  a drive mechanism driven by said gas generator to wind in said retractor shaft in the webbing-winding direction;
  a clutch mechanism connecting said drive mechanism to said retractor shaft; and
  a drive mechanism releasing mechanism for, when said drive mechanism further moves to a webbing winding-out position at the side of a webbing winding-out direction from its initial position before said gas generator is actuated, permitting said retractor shaft to rotate in a webbing winding-out direction in response to the movement to the winding-out position.

10. A seat belt system as claimed in claim 9, wherein said drive mechanism comprises:
  a tension member having one end mounted on said retractor base and the other end connected with said clutch mechanism; and
  a moving mechanism for actuating said tension member, and
  that said drive mechanism releasing mechanism is disposed between the one end of said tension member and said retractor base.

11. A seat belt system as claimed in claim 10, wherein said drive mechanism releasing mechanism comprises a clamp operated by said moving mechanism to clamp the one end of said tension member in cooperation with said retractor base at the initial position and operated by disengagement of said moving mechanism to release the clamping at the webbing winding-out position.

12. A seat belt system equipped with a retractor including a pretensioner comprising:
  a retractor base;
  a retractor shaft rotatably supported by said retractor base and biased in a webbing-winding direction;
  a casing mounted on said retractor base, including a pressure chamber and a moving element passage communicated to the pressure chamber;
  a gas generator for generating a high pressure gas into the pressure chamber;
  a drive mechanism driven by said gas generator to wind in said retractor shaft in the webbing-winding direction; and
  a clutch mechanism connecting said drive mechanism to said retractor shaft, and
  said drive comprises;
    an pushing member driven by a gas pressure generated by said gas generator and disposed in the moving element passage;
    a tension member having one end mounted on said retractor base and the other end mounted on said clutch mechanism; and
    a moving element pushed by said pushing member t he press a portion between both ends of said tension member.

13. A seat belt system as claimed in claim 12, wherein the moving element passage comprises a straight path portion extending in a tangential direction of said retractor shaft, and a circumferential path extending in a circumferential direction of said retractor shaft to surround said retractor shaft.

14. A seat belt system as claimed in claim 13, wherein said pushing member is received in the straight path portion.

* * * * *